(12) United States Patent
Frick

(10) Patent No.: US 8,371,251 B2
(45) Date of Patent: Feb. 12, 2013

(54) METHODS AND APPARATUSES FOR HEATING, CONCENTRATING AND EVAPORATING FLUID

(75) Inventor: Franklin Alan Frick, Houston, TX (US)

(73) Assignee: Phoenix Caliente LLC

( * ) Notice: Subject to any disclaimer, the term of this patent is extended or adjusted under 35 U.S.C. 154(b) by 727 days.

(21) Appl. No.: 12/638,984

(22) Filed: Dec. 16, 2009

(65) Prior Publication Data

US 2010/0154395 A1 Jun. 24, 2010

Related U.S. Application Data

(63) Continuation-in-part of application No. 11/934,645, filed on Nov. 2, 2007, now abandoned, and a continuation-in-part of application No. 12/615,331, filed on Nov. 10, 2009, now abandoned, which is a continuation of application No. 11/748,475, filed on (Continued)

(51) Int. Cl.
 *F22B 3/06* (2006.01)
(52) U.S. Cl. ............. 122/406.1; 122/411; 237/12.3 B
(58) Field of Classification Search ............. 122/26, 122/406.1, 406.2, 406.3, 411; 237/12.3 B, 237/12.3 R; 175/40, 66, 206, 207; 126/247; 166/250.1, 266, 267; 210/708, 737, 738, 210/748
See application file for complete search history.

(56) References Cited

U.S. PATENT DOCUMENTS

| | | |
|---|---|---|
| 2,156,333 A | 5/1939 | Cross |
| 3,198,191 A | 8/1965 | Wyszomirski |
| 3,533,480 A | 10/1970 | Chenevert |
| 3,757,909 A | 9/1973 | McClure |
| 3,791,349 A | 2/1974 | Schaefer |
| 4,027,631 A | 6/1977 | Lavery |
| 4,196,854 A | 4/1980 | Prucyk |
| 4,264,826 A | 4/1981 | Ullman |
| 4,273,075 A | 6/1981 | Freihage |
| 4,370,885 A | 2/1983 | Alekhin |
| 4,438,729 A | 3/1984 | Loesch et al. |
| 4,458,633 A | 7/1984 | Loesch et al. |
| 4,483,277 A | 11/1984 | Perkins |
| 4,494,524 A | 1/1985 | Wagner |
| 4,576,122 A | 3/1986 | Marcato |
| 4,651,681 A | 3/1987 | Perkins |
| 4,693,304 A | 9/1987 | Volland |
| 4,779,575 A | 10/1988 | Perkins |
| 4,781,151 A | 11/1988 | Wolpert et al. |
| 4,843,824 A | 7/1989 | Mushines |
| 5,188,090 A | 2/1993 | Griggs |
| 5,239,948 A | 8/1993 | Sajewski |
| 5,279,262 A | 1/1994 | Muehleck |
| 5,341,768 A | 8/1994 | Pope |
| 5,385,298 A | 1/1995 | Griggs |
| 5,419,306 A | 5/1995 | Huffman |
| 5,472,620 A | 12/1995 | Huang |

(Continued)

OTHER PUBLICATIONS

Leader Energy Services Ltd., Flameless Hot Oiler / Pumping Unit, 2004, 4 pgs, Canada.

(Continued)

*Primary Examiner* — Gregory A Wilson
(74) *Attorney, Agent, or Firm* — Sutton McAughan Deaver PLLC; Albert B. Deaver, Jr.

(57) ABSTRACT

Systems and methods are provided for heating a fluid comprising an opened-loop heating circuit or a closed-loop heating circuit both comprising a rotary heating device, such as a water brake, and a closed-loop direct-fired boiler heating circuit; and systems and methods for evaporating a fluid and systems and methods for concentrating a fluid based on these heating circuits.

20 Claims, 16 Drawing Sheets

Related U.S. Application Data

May 14, 2007, now Pat. No. 7,614,367, and a continuation-in-part of application No. 11/764,270, filed on Jun. 18, 2007, now abandoned, which is a continuation of application No. 11/741,570, filed on Apr. 27, 2007, now abandoned, and a continuation-in-part of application No. 11/738,644, filed on Apr. 23, 2007, now abandoned.

(60) Provisional application No. 61/249,841, filed on Oct. 8, 2009, provisional application No. 60/883,178, filed on Jan. 3, 2007, provisional application No. 60/864,160, filed on Nov. 2, 2006, provisional application No. 60/800,495, filed on May 15, 2006, provisional application No. 60/795,983, filed on Apr. 28, 2006, provisional application No. 60/794,413, filed on Apr. 24, 2006.

(56) References Cited

U.S. PATENT DOCUMENTS

| | | |
|---|---|---|
| 5,551,242 A | 9/1996 | Loesch et al. |
| 5,656,136 A | 8/1997 | Gayaut et al. |
| 5,717,181 A | 2/1998 | Colgate |
| 5,931,153 A | 8/1999 | Giebeler |
| 5,937,848 A | 8/1999 | Madden |
| 5,957,122 A | 9/1999 | Griggs |
| 5,988,280 A | 11/1999 | Crawford et al. |
| 6,016,798 A | 1/2000 | Selivanov |
| 6,164,274 A | 12/2000 | Giebeler et al. |
| 6,200,486 B1 | 3/2001 | Chahine et al. |
| 6,250,561 B1 | 6/2001 | Fujiwara et al. |
| 6,299,735 B1 | 10/2001 | Lumbreras |
| 6,371,381 B1 | 4/2002 | Niwa |
| 6,386,751 B1 | 5/2002 | Wootan et al. |
| 6,581,859 B2 | 6/2003 | Adams et al. |
| 6,595,759 B2 | 7/2003 | Crosta et al. |
| 6,596,178 B1 | 7/2003 | Archibald et al. |
| 6,627,784 B2 | 9/2003 | Hudson et al. |
| 6,666,906 B2 | 12/2003 | Hallman |
| 6,896,718 B2 | 5/2005 | Hallman |
| 6,910,448 B2 | 6/2005 | Thoma |
| 6,974,305 B2 | 12/2005 | Garrett |
| 7,032,544 B2 | 4/2006 | Kuo et al. |
| 7,037,105 B2 | 5/2006 | Hayes |
| 7,089,886 B2 | 8/2006 | Thoma |
| 7,201,225 B2 | 4/2007 | Smith et al. |
| 7,318,553 B2 | 1/2008 | Thoma |
| 7,424,916 B2 | 9/2008 | Foster et al. |
| 7,546,874 B2 | 6/2009 | Smith et al. |
| 7,637,232 B2 | 12/2009 | Foster |

OTHER PUBLICATIONS

PD&E Resources Services Corp., ProHeat Flameless Steamers, 2004, 3 pgs, Canada.

PD&E Resources Services Corp., ProHeat Flameless Boilers, 2004, 3 pgs, Canada.

METHODS AND APPARATUSES FOR HEATING, CONCENTRATING AND EVAPORATING FLUID

CROSS REFERENCE TO RELATED APPLICATIONS

This continuing application is based on, claims priority to and benefit of: 1) U.S. Provisional Application Ser. No. 61/249,841 filed on Oct. 26, 2009; 2) U.S. Non-Provisional application Ser. No. 11/934,645 filed on Nov. 2, 2007, U.S. Provisional Application Ser. No. 60/883,178 filed on Jan. 3, 2007, and U.S. Provisional Application Ser. No. 60/864,160 filed on Nov. 2, 2006; 3) U.S. Non-Provisional application Ser. No. 12/615,331 filed on Nov. 10, 2009, U.S. Non-Provisional application Ser. No. 11/748,475 filed on May 14, 2007, now U.S. Pat. No. 7,614,367 issued on Nov. 10, 2009, and U.S. Provisional Application Ser. No. 60/800,495 filed on May 15, 2006; 4) U.S. Non-Provisional application Ser. No. 11/764,270 filed on Jun. 18, 2007, U.S. Non-Provisional application Ser. No. 11/741,570 filed on Apr. 28, 2007, and U.S. Provisional Application Ser. No. 60/795,983 filed on Apr. 28, 2006; and 5) U.S. Non-Provisional application Ser. No. 11/738,644, filed on Apr. 23, 2007, and U.S. Provisional Application Ser. No. 60/749,413, filed on Apr. 24, 2006; the full disclosure and teaching of each of which is incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed herein relate generally to systems and their use for heating and manipulating industrial fluids.

2. Description of the Related Art

Industrial operations, such as, but not not limited to, oilfield operations, oftentimes require sources of heat to heat a fluid for a variety of purposes. In the past, industry has looked to both flame (or direct fired) and flameless systems to heat industrial fluids.

For example, U.S. Pat. No. 7,424,916 B2 entitled "Flameless Hot to Oiler" is said to describe "[a] flameless heating system comprising: at least one engine, each engine including a coolant for removing heat from the engine and each engine producing exhaust; a loading means for loading the engine; a heat exchange system, the heat exchange system comprising: a heat exchange fluid; a pump for circulating the heat exchange fluid; at least one heat exchanger for is transferring heat from the at least one engine coolant to the heat exchange fluid; and an exhaust heat exchanger for transferring heat from the exhaust of the at least one engine to the heat exchange fluid; a batch fluid; and a heat exchanger for transferring heat from the heat exchange system to the batch fluid, wherein heat is transferred from the engine to the heat exchange system, and from the heat exchange system to the batch fluid."

U.S. Pat. No. 5,279,262 entitled "Mechanical Liquid Vaporizing Waterbrake" is said to describe "[a] water brake which uses mechanical power to kinetically heat water to vapor or steam, and use thereof as a steam generator or cooling water conserving dynamometer or motion retarder. In the simplest embodiment, radial impeller vanes ($5b$) throw water against stator vanes ($6e$), whence the water rebounds to the impeller ($5$). The peripheral rebounding movement continues back and forth. Power dissipates as heat in the water causing the water to increase in temperature and to vaporize. The vapor, being lower in density and viscosity than is the water, flows to and out a central outlet ($9$) while the denser water is centrifugally separated from the vapor and retained in the peripheral rebounding motion. Water leaving as vapor is continually replaced through a cooling water inlet ($8$), allowing continuous operation over wide ranges of speed, torque, power, and steam generation rates, both at steady state and at controlled rates of change."

U.S. Pat. No. 4,264,826 entitled "Apparatus For Generating Thermal Energy And Electrical Energy" is said to describe "[a]n apparatus for generating thermal and electrical energy includes an internal combustion engine connected to and adapted to drive a generator for providing electrical power and a brake for generating thermal energy. In one embodiment, a heat carrier flows through to appropriate conduits for absorbing heat energy from the brake, from the combustion chamber of the engine, and from the engine exhaust gases and delivers the heat energy to a end-use heat exchanger, for example, a room or space heater. In a second embodiment, the engine exhaust gas flow is used to drive a gas turbine that, in turn, drives a compressor in a thermal cycle to provide is additional heat transfer capability."

U.S. Patent Application Publication No. 2006/0185621 A1, published on Aug. 24, 2006 and entitled "Flameless Boiler," is said to describe "[a] flameless boiler comprising generator means for generating heat in fluid circulated there through by shearing of the fluid; a prime mover drivingly connected to the generator means for shearing of the fluid; a supply reservoir for the fluid; a first pump for circulating the fluid from the supply reservoir to the generator means; and a pressure vessel in fluid communication with the generator means for receiving heated fluid there from, the pressure vessel having an outlet for drawing steam therefrom."

U.S. Patent Application Publication No. 2005/0224223 A1, published on Oct. 13, 2005 and entitled "Heating Apparatus for Wells", is said to describe "[a]n apparatus for warming objects such as production conduits at a well site comprises an internal combustion engine driving a well pump. A heat exchanger shell is connected to an exhaust port of the engine, and has an output port. A circulating pump is driven by the engine, and a heating circuit is connected to the circulating pump such that liquid in the heating circuit is pumped from a pump output of the circulating pump through the heating circuit to a pump intake of the circulating pump. The heating circuit comprises a heat absorbing portion inside the heat exchanger shell arranged such that heat from the exhaust of the engine is transferred to the liquid therein, and a heating conduit arranged adjacent to a production conduit or other desired object such that heat from the liquid in the heating conduit is transferred to the object."

The present disclosure is directed to improved systems and methods for heating and manipulating a fluid.

BRIEF SUMMARY OF THE INVENTION

One aspect of the inventions disclosed here is a method of heating a fluid, comprising providing a closed loop heat transfer system comprising an internal combustion engine adapted to convert chemical energy into at least mechanical energy and waste heat energy; a rotary heating device operatively coupled to the engine and adapted to heat a liquid flowing there through by converting mechanical energy from the engine into thermal energy; a tank vented to the atmosphere and fluidly coupled to the rotary heating device and adapted to contain a portion the liquid in the closed loop system; a circulation pump adapted to pump the liquid through the closed loop system; a exhaust heat exchanger fluidly coupled to the tank and adapted to transfer thermal energy from a first portion of the waste heat to the liquid; a portion of a fluid-to-fluid heat exchanger fluidly coupled to the exhaust heat exchanger and to the rotary heating device; and wherein the closed loop heat transfer system is configured to operate at atmospheric pressure and to heat the liquid to less than an atmospheric boiling point of the liquid; providing an open system comprising: a third heat exchanger adapted to transfer thermal energy from another portion of the waste heat to the fluid; a second portion of the fluid-to-fluid heat exchanger fluidly coupled to the third heat exchanger; and a pump adapted to pump the fluid through the open system so that thermal energy in the closed-loop liquid is transferred across the fluid-to-fluid heat exchanger to the fluid; operating the closed loop system to heat the liquid to below its boiling point; pumping the fluid through the open system; and transferring thermal energy from the closed-loop liquid to the open system fluid, thereby heating the fluid.

Another aspect of the inventions disclosed herein is a fluid heating system comprising: a closed loop heat transfer system comprising: a internal combustion engine adapted to convert chemical energy into at least mechanical energy and waste heat energy; a rotary heating device operatively coupled to the engine and adapted to heat a liquid flowing there through by converting to mechanical energy from the engine into thermal energy; a tank vented to the atmosphere and fluidly coupled to the rotary heating device and adapted to contain a portion the liquid in the closed loop system; a circulation pump adapted to pump the liquid through the closed loop system; a exhaust heat exchanger fluidly coupled to the tank and adapted to transfer thermal energy from a first portion of the waste heat to the liquid; a portion of a fluid-to-fluid heat exchanger fluidly coupled to the exhaust heat exchanger and to the rotary heating device; and wherein the closed loop heat transfer system is configured to operate at atmospheric pressure and to heat the fluid to less than an atmospheric boiling point of the liquid; and an open system comprising: a third heat exchanger adapted to transfer thermal energy from another portion of the waste heat to the fluid; a second portion of the fluid-to-fluid heat exchanger fluidly coupled to the third heat exchanger; and a pump adapted to pump the fluid through the open system so that thermal energy in the closed-loop liquid is transferred across the fluid-to-fluid heat exchanger to the fluid, thereby heating the fluid.

BRIEF DESCRIPTION OF THE SEVERAL VIEWS OF THE DRAWINGS

The Figures described below are provided as an aid to understanding the written descriptions provided herein of my inventions. Neither the Figures nor the written descriptions thereof are intended to limit the scope of the appended claims. Rather, the Figures and written descriptions are provided to illustrate the inventive concepts to a person of skill in the art and to enable such person to make and use the inventive concepts.

DETAILED DESCRIPTION

Figure 1:
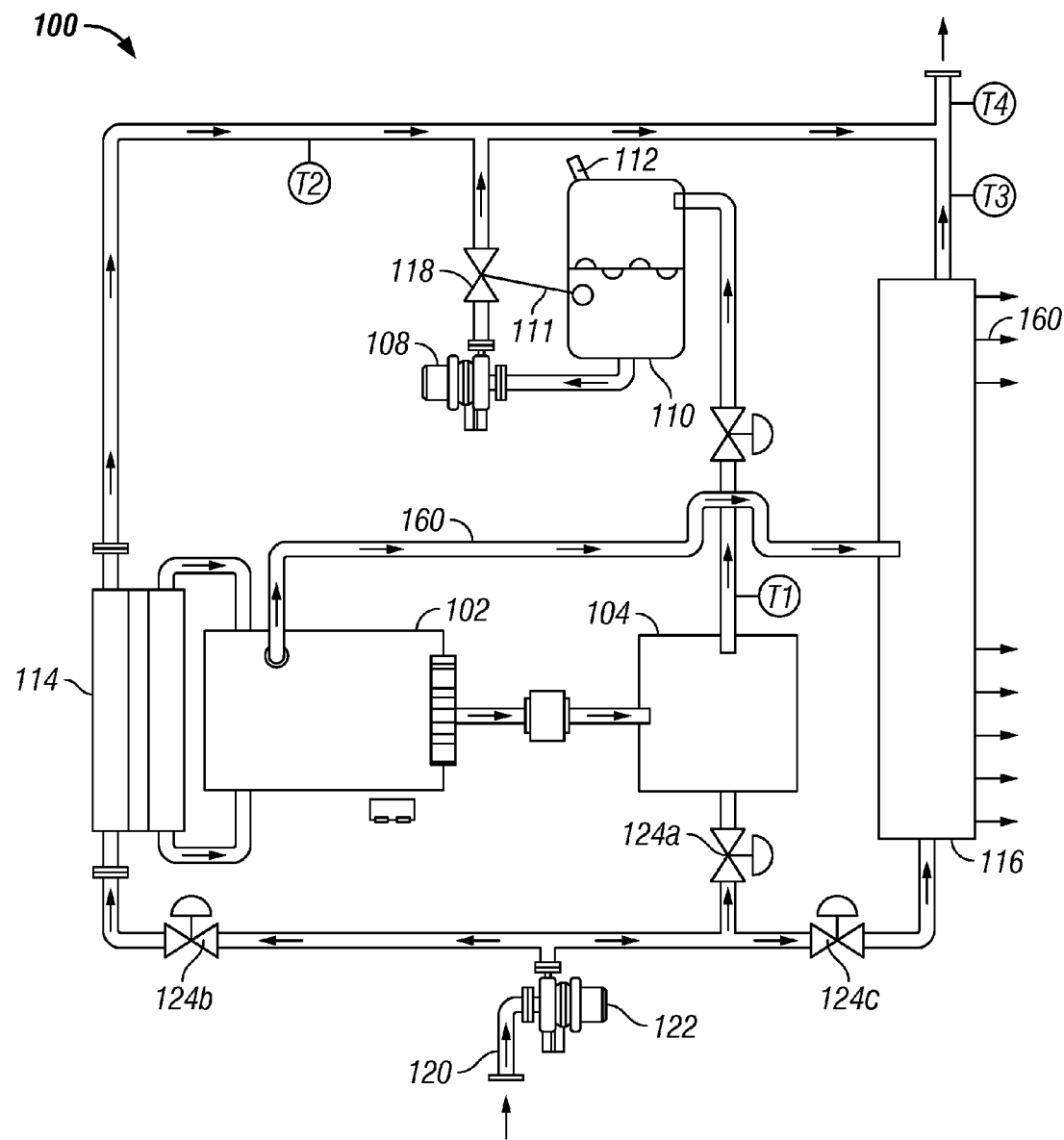
FIG. 1 illustrates an opened-loop fluid heating system utilizing a rotary heating device.

One or more illustrative embodiments incorporating the inventions disclosed herein are presented below. Not all features of an actual implementation are described or shown for the sake of clarity. Persons of skill appreciate that in the development of an actual embodiment incorporating aspects of the present inventions, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a normal undertaking for those of ordinary skill in the art having benefit of this disclosure.

In general terms, I have invented systems and methods for heating industrial fluids. Embodiments of my fluid heating systems may comprise opened-loop system or a closed-loop system. By "opened loop," I mean that the fluid that is desired to be heated is the fluid that flows through the primary heating devices. By "closed loop," I mean that the fluid that is desired to be heated flows through a heat exchanger to pick up heat from another fluid that that flows through the primary heating devices.

One embodiment of my fluid heating inventions is a opened-loop system in which the fluid to be heated flows along a plurality of heat paths. For example, one heat path may comprise a rotary heating device coupled to a rotary kinetic energy generator, such as, but not limited to, an internal combustion engine, an external combustion engine or an electric motor. The fluid may be heated in the rotary heating device and delivered to a reservoir or accumulator. A second heat path may comprise a fluid-to-fluid heat exchanger configured to transfer heat from the engine's water jacket to the fluid. A third heat path may comprise and air-to-fluid heat exchanger configured to transfer heat from the engine's exhaust to the fluid. All three paths may be combined to produced heated fluid. It will be appreciated that pumps and valving can be used to control the temperature of the fluid.

Another embodiment of my fluid heating inventions is a closed-loop system having a first fluid-to-fluid (such as liquid-to-liquid) heat exchanger that divides the heating system into a primary fluid section and a secondary fluid section. The primary fluid section may comprise a rotary kinetic energy generator, preferable a diesel engine. The rotary kinetic energy is used to energize a rotary heating device. A primary or working fluid, such as, but not limited to, water or a water-based mixture, is circulated through the rotary heating device to thereby heat the working fluid. In addition, all or a portion of the thermal energy from the rotary kinetic energy generator may be transferred to the fluid as well by one more heat exchangers. A secondary, or worked, fluid may be passed through the first heat exchanger to transfer energy from the working fluid to the worked fluid, thereby heating the worked fluid.

Yet another embodiment of my fluid heating inventions is a closed-loop system having a direct-fired boiler, such as a natural gas heater. Fluid heated in the boiler flows through a primary heat exchanger, such as a fluid-to-fluid heat exchanger to transfer heat to the fluid to be heated, i.e., the worked fluid. Fluid leaving the primary heat exchanger may be accumulated in a reservoir prior to being re-heated in the boiler.

Any variety of rotary heating devices may be used for embodiments of the inventions disclosed herein. For example, a rotary heating device may comprise any of a number of known devices, such as, but not limited to, a water brake, a dynamometer, a cavitation heater (such as those disclosed in U.S. Pat. No. 7,201,225), and a shear plate or friction heater. It is preferred that the rotary heating device for the closed-loops systems disclosed herein an instrumented water brake (e.g., a dynamometer), such as, but not limited to, Model TD3100 available from Taylor Dynamometer.

Turning now to more specific embodiments of my inventions, FIG. 1 illustrates a flameless fluid heating system 100. The system 100 illustrated in FIG. 1 directly heats the fluid of interest, i.e., the worked fluid. In other words, this is an "opened-loop" design in which the fluid to be heated, such as, for example, fracturing fluid, is passed directly through the rotary heating device 104. In this embodiment, the rotary generator 102 is a diesel engine of, for example, 750 hp and the rotary heater is a Taylor Dynamometer model TD3100. Fluid to enters the system 100 at inlet 120, preferably through an appropriately sized centrifugal pump 122, and is allowed to flow through three substantially parallel heating paths. Adjustment of fluid flow among these paths and, therefore, fluid temperature may be controlled by flow control devices or valves 124a, 124b and 124c.

A first path is through valve 124a to the rotary heater 104 where torque from the engine 102 heats the fluid. The fluid leaves the rotary heater 204 and is collected in a tank 110 that is vented 112 to atmosphere. A main circulation pump 108 draws heated fluid from the tank 110 and returns it to system 100, generally. The tank 110 may have a fluid level control 111 adapted to control a flow valve 118 to regulate the level of fluid inside the tank 110.

A second fluid heating path has a portion of the fluid passing through restriction 124b and into a fluid-to-fluid heat exchanger 414 adapted to transfer heat from the diesel engine 102, such as from the water jacket coolant, to the worked fluid. Fluid heated in exchanger 114 is combined with fluid from the rotary heater 104 as illustrated in FIG. 1A third fluid heating path has a portion of the fluid passing through valve 124c and an air-to-fluid heat exchanger 116, such as a finned tube heat exchanger, adapted to transfer heat from the engine exhaust 160 to the fluid. Heated fluid exiting the heat exchanger 116 is combined with heated fluids from the rotary heater 104 and heat exchanger 114, with the combined heated fluid exiting the system 100 at outlet 126. The system illustrated in FIG. 1 was designed to raise the temperature of water by about 38° F. at a flow rate of about 280 gallons per minute.

Figure 2:
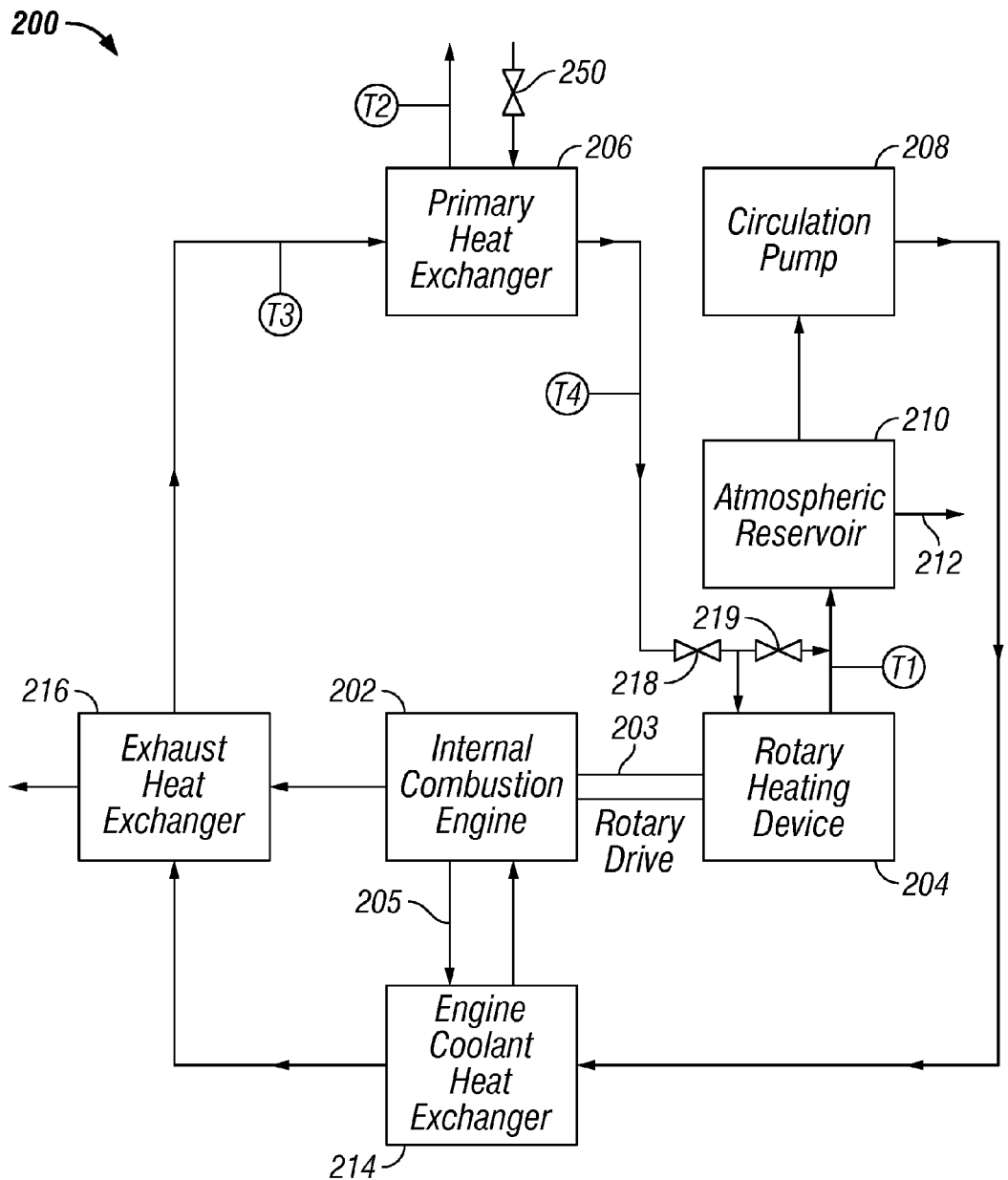
FIG. 2 illustrates a closed-loop fluid heating utilizing a rotary heating device.

Turning now to FIG. 2, disclosed is one of many possible embodiments of a closed-loop fluid heating system 200. The heating system 200 may comprise a rotary kinetic energy generator 202, a rotary heating device 204 and a primary heat exchanger 206 all plumbed in closed-loop fluid communication.

The rotary kinetic energy generator 202 may comprise any of a number of rotary prime movers, such as, but not limited to electric, pneumatic or hydraulic motors, and internal or external combustion engines. It is preferred that rotary generator 202 be a conventional diesel or natural gas engine, such as, for example, a 750 hp diesel engine. It will be appreciated that the amount of horsepower generated by the prime mover 202 will control the amount of heat generated by the system 200.

The rotary heating device 204 is preferably a water brake, and most preferably a water brake dynamometer, such as Model TD3100 available from Taylor Dynamometer.

The output shaft 203 of the rotary generator 202 may be coupled to the rotary heater 204 in known fashion. For example, flex joints or other coupling mechanisms (not shown) may be used as needed to couple the rotary generator 202 to the rotary heater 204. One benefit of using a water brake dynamometer as the rotary heating device is that it may be directly coupled to the flywheel or output shaft of an internal combustion engine.

The outlet side of the rotary heater 204 may be coupled to a reservoir or tank 210. Based on the operating characteristics of the rotary heater 204, the tank 210 may be pressurized, evacuated or un-pressurized. For the present embodiment using a water brake dynamometer as the rotary heater 204, it is preferred that tank 210 be un-pressurized and vented 212 to atmosphere, thereby operating at atmospheric conditions. A fluid circulation pump 208, such as a centrifugal pump, is adapted to circulate or pump the fluid, i.e. the working fluid, through the system 200.

Working fluid may be circulated from the tank 210 to a fluid-to-fluid heat exchanger 214 adapted to transfer heat from the rotary generator 202 to the working fluid to further heat the fluid. For example, FIG. 2 illustrates that the engine coolant 205 from, e.g., the engine's water jacket, is used to further heat the working fluid. It will be appreciated that heat exchanger 214 may be in addition to or in lieu of the engine's conventional air-to-fluid radiator. The working fluid that exits the heat exchanger 214 may pass through another heat exchanger 216, such as an air-to-fluid heat exchanger, to transfer energy from the engine's exhaust gases to the working fluid. As a matter of system design to left to those of skill in the art, the engine's exhaust may pass entirely through the heat exchanger 216, or may be apportioned such one portion passes through the heat exchanger 216 and the remainder passes through a conventional muffler or exhaust system (not shown).

It will be appreciated that while FIG. 2 illustrates the water jacket heat is exchanger 214 down stream from the exhaust gases heat exchanger 216, such orientation is not required and may be reversed or eliminated. It is preferred; however, that any supplement heat exchangers, such as heat exchangers 214 and 216 be located between the discharge side of the rotary heater 204 and the primary heat exchanger 206. Heated working fluid is circulated from supplemental heat exchangers 214 and/or 216 to primary heat exchanger 206 and from there back to the rotary heating device 204 to complete the closed loop.

A controllable valve or other flow restriction device 218 may be located on the inlet side of the rotary heating device 204 In the embodiment shown in FIG. 2, the valve 218 is controlled by the water brake controller (not shown) as a function of engine 202 torque. Thus, valve 218 is controlled to load the rotary heater 204 such that the engine operates near it peak torque.

Also shown in FIG. 2 is bypass circuit 219, which may be used to control the temperature of the fluid exiting the rotary heating device 204. It will be appreciated that depending on the type of rotary heating device 204 used, a back pressure valve (not shown) between the rotary heater 204 and the tank 210 may be used to maintain appropriate pressure on the rotary heater 204.

It will be appreciated that heating system 200 may be used to heat fluids of all types by flowing such fluid (the "worked" fluid) through primary heat exchanger 206 as illustrated in FIG. 2. System 200 may be instrumented as desired, and as illustrated in FIG. 2, several temperature transducers, T, may be beneficial. For example, monitoring the temperature T1 of the working fluid prior to entry into tank 210 is useful especially where the tank is vented 212 to atmosphere. Keeping the temperature of the working fluid below its atmospheric to boiling point will prevent loss of the working fluid to the atmosphere. It may be desired to monitor the temperature T4 of the working fluid as it enters the rotary heater 204 and/or prior to its entry T3 into the primary heat exchanger 206. It will be appreciated that working fluid temperature T3 can be controlled in several ways, including adjusting the flow rate of the worked fluid through heat is exchanger 206, and/or adjusting the torque generated by the rotary generator 202, and/or adjusting the flow or working fluid into the rotary heating device. Controllable bypass loops (not shown) can also be established for each heating source, such as rotary heater 204 and heat exchangers 214 and 216. It will be appreciated that the system 200 can be used to heat a fluid, i.e., the "worked fluid" by passing the worked fluid through fluid-to-fluid heat exchanger 206. A flow control device 250, such as a valve or a pump, can be used to control the temperature, T2, of the worked fluid.

Figure 3:
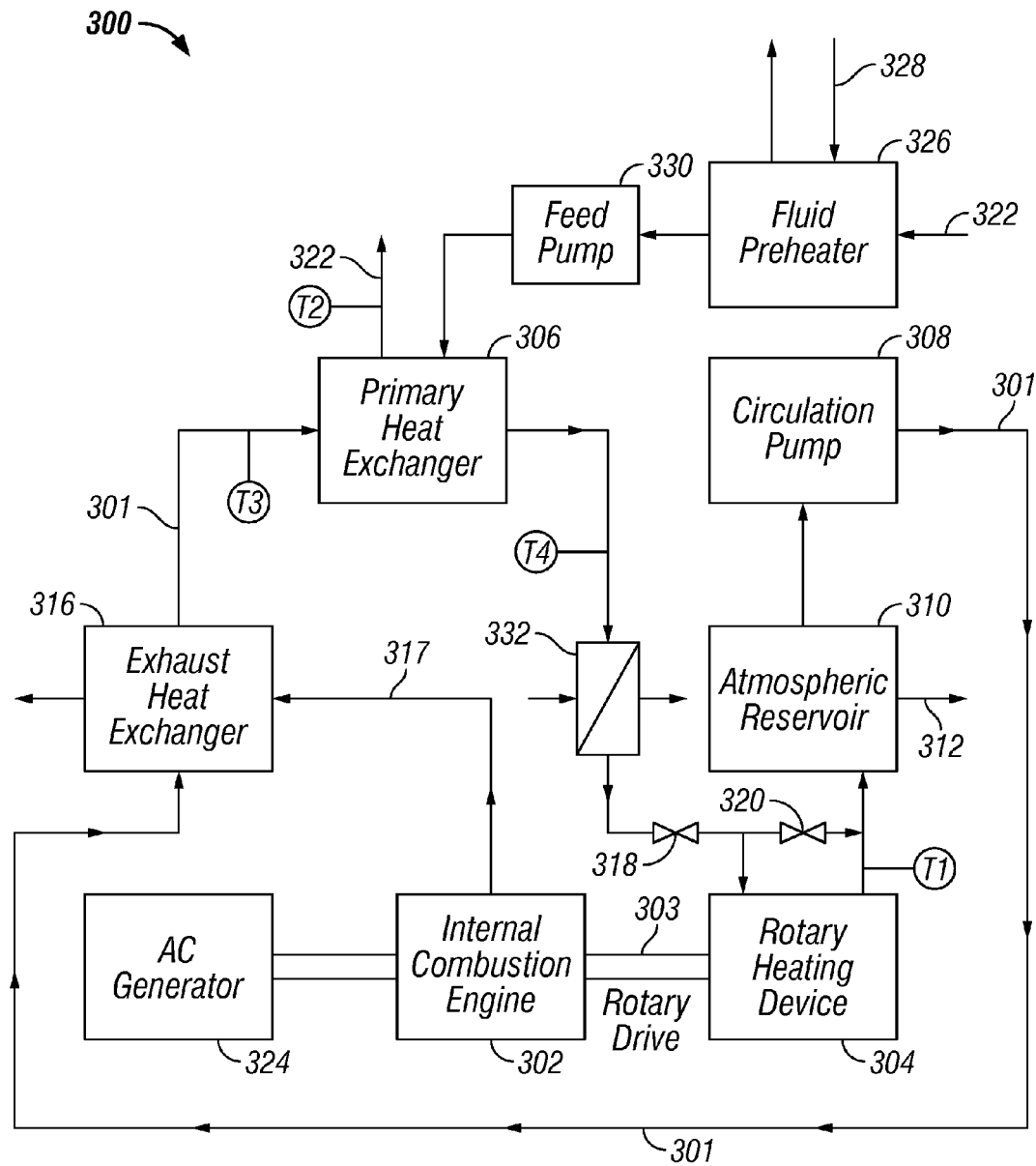
FIG. 3 illustrates another embodiment of a closed-loop fluid heating system utilizing a rotary heating device.

Moving on to FIG. 3, a flameless heating system 300 is illustrated. The fluid heating system 300 may comprise a rotary kinetic energy generator 302, a rotary heating device 304 and a primary heat exchanger 306 all plumbed in closed-loop fluid communication. The fluid to be heated, or worked fluid 322, is passed through the primary heat exchanger 306 to transfer heat from the working fluid 301 to the worked fluid 322.

It is preferred that rotary generator 302 be a conventional diesel or natural gas engine, such as, for example, a 600 hp diesel engine and that the rotary heating device 304 be a water brake dynamometer, such as, but not limited to, Model TD3100 available from Taylor Dynamometer.

The output shaft 303 of the rotary generator 302 may be coupled to the rotary heater 304 in known fashion. For example, flex joints or other coupling mechanisms (not shown) may be used as needed to couple the rotary generator 302 to the rotary heater 304. One benefit of using a water brake dynamometer as the rotary heating device 304 is that it may be directly coupled to the flywheel or output shaft of an internal combustion engine.

The outlet side of the rotary heater 304 may be coupled to a reservoir to or tank 310. Based on the operating characteristics of the rotary heater 304, the tank 310 may be pressurized, evacuated or un-pressurized. For the embodiment of FIG. 3 using a water brake dynamometer as the rotary heater 304, it is presently preferred that tank 310 be un-pressurized and vented 312 to atmosphere, thereby operating at atmospheric conditions. A fluid circulation is pump 308, such as a centrifugal pump, may be adapted to circulate or pump the fluid, i.e. the working fluid, through the system 300.

The working fluid 301 may pass through a heat exchanger 316, such as an air-to-fluid heat exchanger, to transfer energy from the engine's exhaust gases 317 to the working fluid 301. As a matter of system design left to those of skill in the art, the engine's exhaust 317 may pass entirely through the heat exchanger 316, or may be apportioned such one portion passes through the heat exchanger 316 and the remainder passes through a conventional muffler or exhaust system (not shown). It is preferred that exhaust gas heat exchanger 316, and any additional or supplement heat exchangers, be located between the discharge side of the rotary heater 304 and the primary heat exchanger 306. Heated working fluid 301 is circulated from heat exchangers 316 to primary heat exchanger 306 and from there back to the rotary heating device 304 to complete the closed working fluid heating loop.

A controllable valve or other flow restriction device 318 may be located on the inlet side of the rotary heating device 304 In the embodiment shown in FIG. 3, the valve 318 is controlled by the water brake controller (not shown) as a function of engine 302 torque. Thus, valve 318 is controlled to load the rotary heater 304 such that the engine operates near it peak torque or peak efficiency. Also shown in FIG. 3 is bypass circuit 320, which may be used to control the temperature of the working fluid 301 exiting the rotary heating device 304. It will be appreciated that depending on the type of rotary heating device 304 used, a back pressure valve (not shown) between the rotary heater 304 and the tank 310 may be used to maintain appropriate pressure on the rotary heater 304.

It will be appreciated that most, if not all, internal combustion engines to suitable for use with the embodiment described in FIG. 3 will be supercharged by either an exhaust gas supercharger (i.e., turbocharger) or a mechanical supercharger. In either instance the pressurized air is heated by the supercharger to typically undesirable levels, which temperature adversely affects the power that the engine 302 can generate. To recovery some of that waste heat and/or to increase the efficiency of the engine, either the worked fluid 322 or the working fluid 301 may be used to cool the supercharged air. In a preferred embodiment of the system 300 illustrated in FIG. 3, an air-to-fluid heat exchanger 332 may be inserted into the working fluid 301 discharge line between the primary heat exchanger 306 and the rotary heating device 304 to transfer heat from the supercharged air to the working fluid 301.

Also shown in FIG. 3 is an optional electrical generator 324 coupled to the engine 302. For example and not limitation, the generator 324 may be a 50 kilowatt AC generator producing 480 volt, 3 phase power for use in powering and controlling the various pumps and instruments associated with system 300.

It will be appreciated that the fluid heating system 300 may be used to heat fluids of all types by flowing such fluid 322 (the "worked" fluid) through primary heat exchanger 306 as illustrated in FIG. 3.

In contrast to the system 200 shown in FIG. 2, system 300 of FIG. 3 is designed to use the waste heat from the engine's 302 water jacket to preheat the worked fluid 322. As shown in FIG. 3, a worked fluid preheat heat exchanger 326 may be used to transfer heat from the engine coolant 328 to the worked fluid 322 before it enters the primary heat exchanger 306. It will appreciated that heat exchanger 326 may be in addition to or in lieu of the engine's conventional air-to-fluid radiator heat exchanger. It is preferred a temperature controlled valve (not shown) be used to control the volume or flow rate of engine coolant delivered to heat exchanger 326 so that the engine 302 is not overcooled. Worked fluid pump 330 maybe located before or after preheater 326, but preferably before. Although not shown in FIG. 3, it will be appreciated that valves, controllable valves, instruments or transducers can be located adjacent the worked fluid inlet to or outlet of the primary heat exchanger 306 to monitor or control the properties and characteristics of heated worked fluid 322.

System 300 may be instrumented as desired, and as illustrated in FIG. 3, several temperature transducers, T, may be beneficial. For example, monitoring the temperature T1 of the working fluid 301 prior to entry into tank 310 is useful especially where the tank is vented 312 to atmosphere. Keeping the temperature of the working fluid 301 below its atmospheric boiling point will prevent loss of the working fluid to the atmosphere. It may be desired to monitor the temperature T4 of the working fluid 301 as it enters the rotary heater 304 (or prior to charge air heat exchanger 332) and/or prior to its entry T3 into the primary heat exchanger 306. It will be appreciated that working fluid temperature T3 can be controlled in several ways, including adjusting the flow rate of the worked fluid through heat exchanger 306, and/or adjusting the torque generated by the rotary generator 302, and/or adjusting the flow of working fluid into the rotary heating device 304. Controllable bypass loops (not shown) can also be established for each heating source, such as rotary heater 304 and heat exchanger 316. It will be appreciated that the system 300 can be used to heat a fluid 322, i.e., the "worked fluid" by passing the worked fluid through fluid-to-fluid heat exchanger 306. A flow control device 330, such as a valve or a pump, can be used to control the temperature, T2, of the worked fluid.

Figure 4:
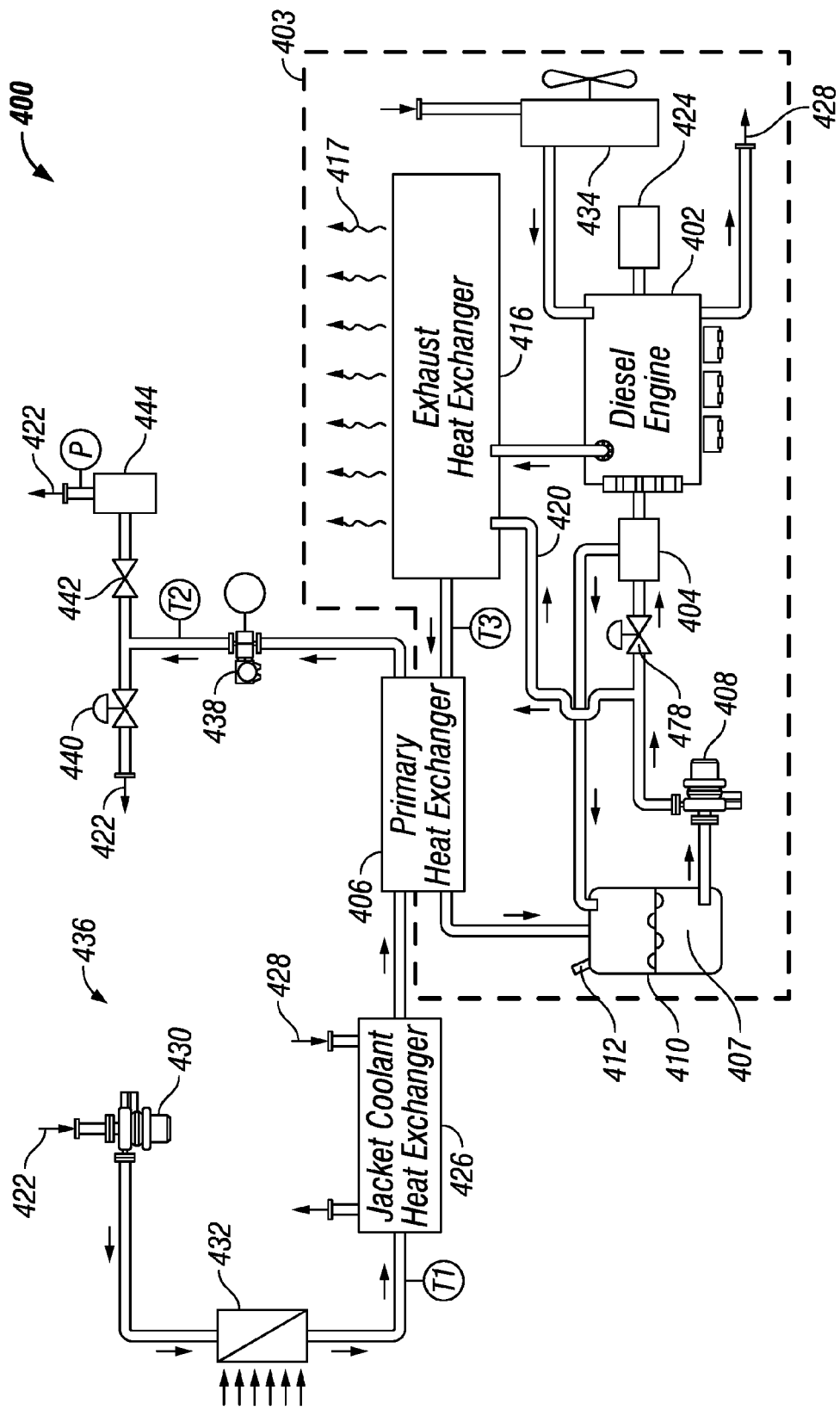
FIG. 4 illustrates yet another embodiment of a closed-loop fluid heating system utilizing a rotary heating device.

In FIG. 4, another embodiment of a flameless fluid heating system 400 is illustrated. The fluid heating system 400 may comprise a closed-loop heat transfer subsystem shown by a dashed line 403. The closed-loop heat transfer system 403 of FIG. 4 comprises a diesel engine 402, which is preferably a 600 horsepower, Tier III, turbocharged, diesel engine; a rotary heating device 404, which is preferably a Model TD3100 available from Taylor Dynamometer; a working fluid tank 410; an engine exhaust gas heat exchanger 416; and a primary fluid-to-fluid heat exchanger 406, all plumbed in closed-loop fluid communication.

The water brake 404 is directly coupled to the flywheel or output shaft of the diesel engine 402. The inlet of the water brake 404 is coupled to a controllable valve 418 to control the amount of closed-loop fluid, i.e., working fluid 401, allowed into the water brake 404 at any given time. The water brake 404 heats the working fluid 401 therein and discharges the heated working fluid to the tank 410. For the embodiment of FIG. 4, the tank 410 is un-pressurized and vented 412 to atmosphere, thereby operating at atmospheric conditions.

Working fluid 401, which is preferably a glycol and water mixture, is drawn from the tank 410 by pump 408 and the working fluid that is that is not passed through valve 418 to the water brake 404 is directed to exhaust gas heat exchanger 416 where it is further heated by the engine exhaust gas 417. Heated working fluid 401 is then pumped from the exhaust gas heat exchanger 416 into the primary heat exchanger 406, which is preferably a frame-and-plate, fluid-to-fluid heat exchanger.

Also shown in FIG. 4 is an optional electrical generator 424 coupled to the engine 402. In the embodiment illustrated in FIG. 4, the generator 424 is a 50 kilowatt AC generator producing 480 volt, 3 phase power for use in powering and controlling the various pumps and instruments associated with system 400. FIG. 4 also shows conventional engine radiator 434.

Having now described the heat transfer system 403 illustrated in FIG. 4, it will be appreciated that the system 403 may be run continuously to provide thermal energy in the working fluid 403 that can be used to heat another fluid passing through the other portion of primary heat exchanger 406.

To accomplish this heating of a another fluid, i.e., the worked fluid 422, system 400 also comprises an open system 436 comprising an inlet pump 430 and an engine jacket heat exchanger 426 fluidly coupled to the primary heat exchanger 406. The discharge side of the primary heat exchanger 406 comprises instrumentation 438, such as but not limited to, temperature transducers, flow rate transducers, mass flow rate transducers and others; controllable valves 440, manual valves 442 and discharge pumps 444, as desired or required for a particular purpose.

Because the diesel engine 402 preferred for use in this embodiment described in FIG. 4 is air supercharged, the embodiment of FIG. 4 includes a charge air heat exchanger 432 positioned upstream of the engine jacket coolant heat exchanger 426. In this configuration, the relatively cool fluid-to-be-heated 422 cools the charge air before it is introduced into the engine's combustion chambers, thereby preheating the worked fluid 422. Alternately, as described with respect to FIG. 3, the charge air heat exchanger 432 may be located in the heat transfer system 403 and preferably between the discharge of the primary heat exchanger 406 and the tank 410.

It will now be appreciated that heating system 400 may be used to heat fluids, i.e., a worked fluid 422, of all types by flowing such fluid 422 through primary heat exchanger 406 as illustrated in FIG. 4. System 400 may be instrumented as desired, and as illustrated in FIG. 4, several temperature transducers, T, may be beneficial. For example, monitoring the temperature T1 of the worked fluid 422 prior to entry into charge air heat exchanger 432 and temperature, T2, of the worked fluid 422 exiting the system 400. It will be appreciated that worked fluid temperature T2 can be controlled in several ways, including adjusting the flow rate of the worked fluid through heat exchanger 406, and/or adjusting the torque generated by the engine 402, and/or adjusting the flow of working fluid into the water brake 404.

Figure 5:
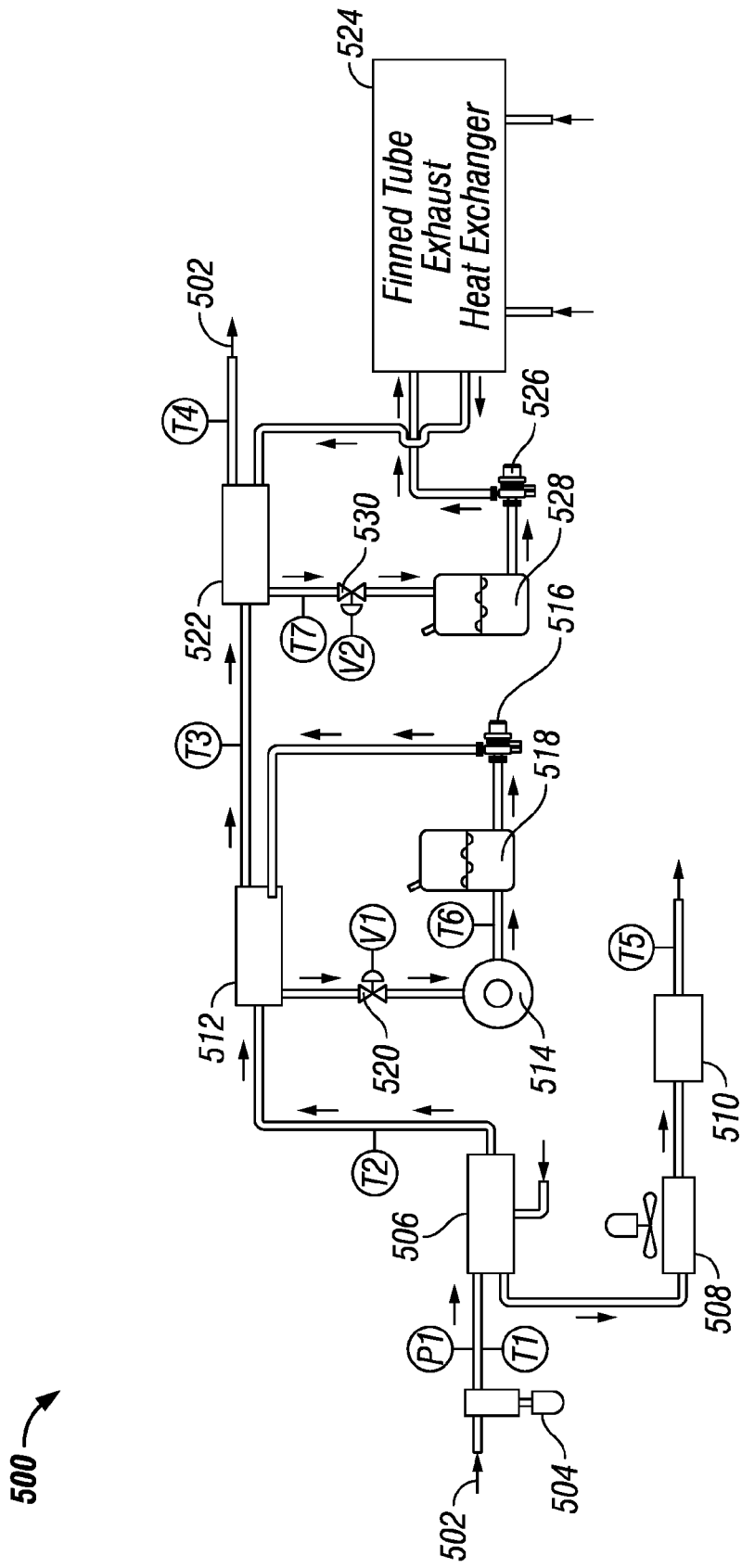
FIG. 5 illustrates still another embodiment of a closed-loop fluid heating system utilizing a rotary heating device

FIG. 5 illustrates another embodiment of a fluid heating system 500 using aspects of my inventions. The system 500 comprises a plurality of closed-loop heating circuits arranged sequentially to heat a worked fluid 502. The fluid to be heated 502 is pumped into the system 500 by a variable speed pump 504, such as those offered by Viking. The speed control allows the residence time of the fluid 502 within the system 500 to be controlled, thereby controlling the final temperature, T4, of the fluid 502. Indeed, in a preferred embodiment, temperature transducer T4 controls the pump 504.

The fluid 502 is pumped through one side/portion of a fluid-to-fluid to heat exchanger 506. In FIG. 5, heat exchanger 506 is configured to transfer heat from an internal combustion engine's (not shown) water jacket (working fluid #1) to the fluid 502. As shown, this first closed-loop heating circuit may also include an auxiliary air-to-fluid heat exchanger 508 (or radiator) to ensure that the engine has adequate cooling, and may include an after cooler heat exchanger 510 to is cool supercharged or pressurized intake air for the engine.

Fluid 502 heated by this first closed-loop section to temperature T2 is pumped to a second fluid-to-fluid heat exchanger 512. Heat exchanger 512 is configured to transfer heat from another fluid (working fluid #2) heated by a rotary heating device 514, such as a water brake, to the fluid 502. The water brake 514, preferably a TD3100 Taylor dynamometer, is driven by an internal combustion engine (not shown), such as a 700 HP diesel engine. The working fluid heated by the water brake is pumped 516 to an atmospheric reservoir or accumulator 518. Controllable valve 520 controls the volume of working fluid entering the water brake 514 and, therefore, the temperature T6. After passing through heat exchanger 512, the worked fluid 502 is heated to temperature T3.

Fluid 502 heated by the first and second closed-loop sections to temperature T3 is pumped to a third fluid-to-fluid heat exchanger 522. Heat exchanger 522 is configured to transfer heat from yet another fluid (working fluid #3) heated by an engine exhaust heat exchanger 524, such as a finned tube air-to-fluid heat exchanger, to the fluid 502. It will be appreciated that the exhaust gasses from any internal combustion or external combustion engine may be used by heat exchanger 524 to heat the working fluid. In FIG. 5, exhaust gasses from the engine that drives rotary heating device 514 and exhaust gasses from a 75 kW electrical generator, which provides electricity for operating an controlling the pumps, valves and other equipment associated with system 500, are used to heat the working fluid.

The working fluid heated by the exhaust heat exchanger 524 is pumped 526 to the third fluid-to-fluid heat exchanger 522 to raise the temperature of the worked fluid 502 to its final temperature, T4. Working fluid to exits the heat exchanger 522 and flows into an atmospheric reservoir or accumulator 528. Controllable valve 530 controls the residence time of the working fluid in the heat exchanger 522 and, therefore, the temperature T7.

While the system 500 illustrated in FIG. 5 is a sequential or serial heating system, it will be appreciated that the plurality of closed-loop heating is circuits can be arranged in parallel similar to the opened-loop system disclosed in FIG. 1.

An embodiment of the system 500 illustrated in FIG. 5 may consume 5,000,000 Btu/Hr (35 gallons diesel/hr) and transfer approximately 4,500,000 Btu/hr to the worked fluid 502. The system 500 may raise the temperature of 60 F water to 140 F at a rate of 2.7 Bbl/min or 3.1 hours for 500 Bbl, and the temperature of oil at 60 F to 210 F at 3.3 Bbl/min.

Figure 6:
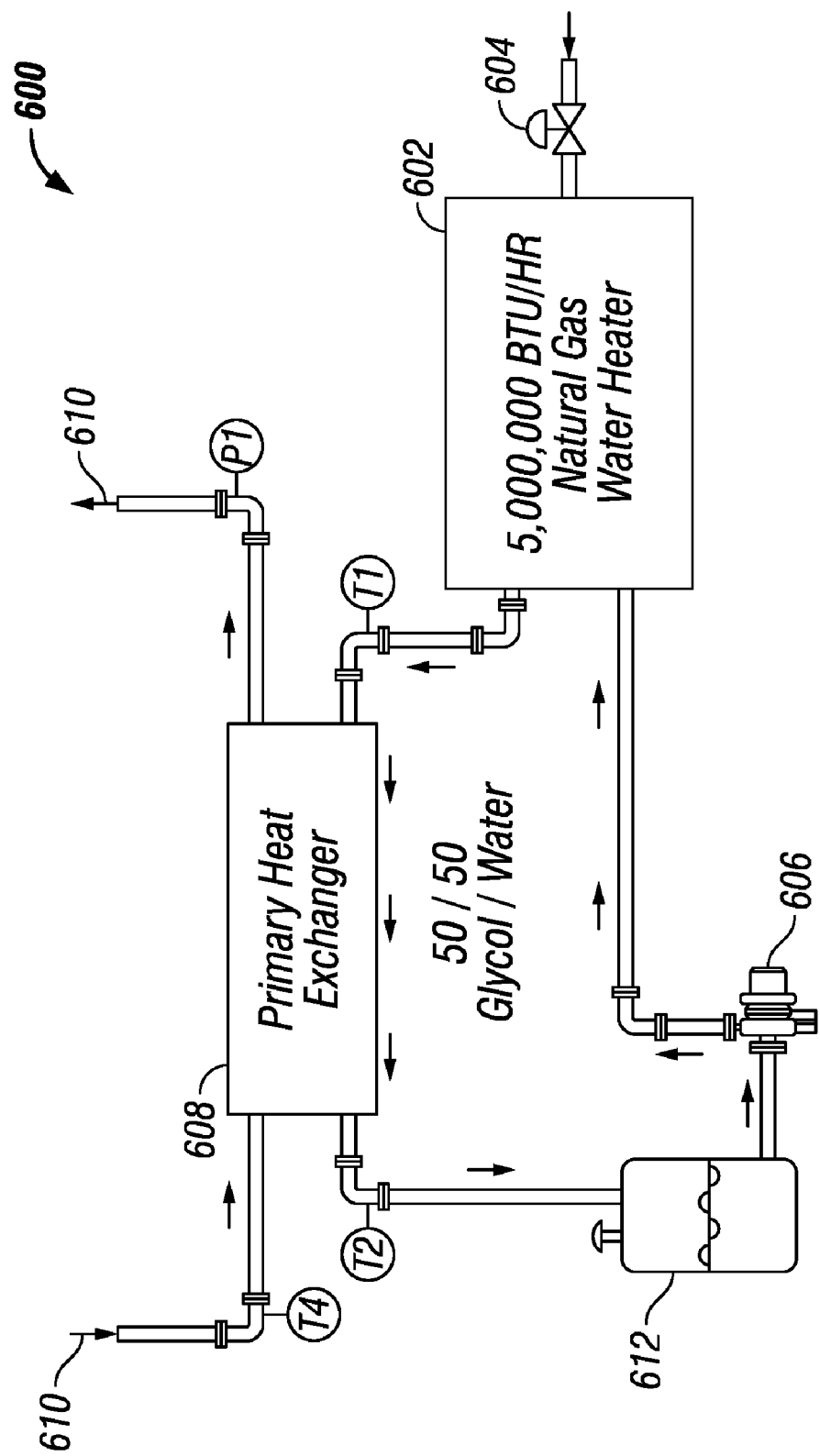
FIG. 6 illustrates a closed-loop fluid heating system utilizing a direct-fired boiler.

Turning now to FIG. 6, a direct-fired fluid heating system 600 is disclosed. The heating system 600 comprises a direct-fired fluid heater 602, which is preferably a 5,000,000 BTU/hr natural gas water heater. It is contemplated that the heater 602 would be fired with waste gas from the field metered into the heater 602 through pressure control valve 604. Therefore, it is desirable that the heater 602 burner controls (not shown) allow for substantially real-time gas-to-air adjustments to account for changing gas quality. The working fluid in the closed-loop heating circuit is preferably a 50/50 mixture of water and glycol. The heater 602 heats the working fluid to temperature T1, which may be, for example, 210 F. The heated working fluid is pumped 606 through a fluid-to-fluid heat exchanger 608 to transfer heat from the working fluid to the worked fluid 610. Working fluid exits the heat exchanger 608 and enters an atmospheric reservoir or accumulator 612. Pump 606 draws working fluid out of the reservoir 612 and feeds it back to heater 602. A temperature transducer T1 cooperates with controllable valve 604 to control the temperature of the working fluid. In the system illustrated in FIG. 6, the worked fluid may be heated to about 170 F.

It will now be appreciated that FIGS. 1-6 illustrate merely several of many possible embodiments of fluid heating systems using rotary heating devices or direct-fired heating devices. Those of skill in the art will be able to design closed- or opened-loop fluid heating systems according to this disclosure for a wide variety of fluids and for a wide variety of purposes. For example, heating of corrosive or abrasive fluids may benefit from the closed-loop design of FIGS. 2-6, although the rotary heater may be fabricated from corrosion and/or abrasion resistant materials, if desired, for opened-loop systems. In addition, the temperature to which the fluid is heated may determine whether a closed- or open-loop system is desired. For example, the potential for and effects of scaling in the heat exchangers and/or rotary heater should be considered in any design.

A fluid heating system, such as systems such as those shown above, may form a subsystem of other systems, such as the fluid concentrating systems or fluid evaporating systems discussed below. In addition, the fluid heating systems described herein may be used in the oil field for heating fluids for paraffin flushing or for a well "kill" truck.

Turning now to fluid evaporation systems and methods, such systems may comprise a flash tank in which the heated worked fluid is separated into vapor (e.g., steam) and liquid portions. The steam portion may be passed through an air-to-fluid heat exchanger to transfer heat from the steam to the air. The heated air may then be used to evaporate some or the entire liquid portion of the worked fluid.

Figure 7:
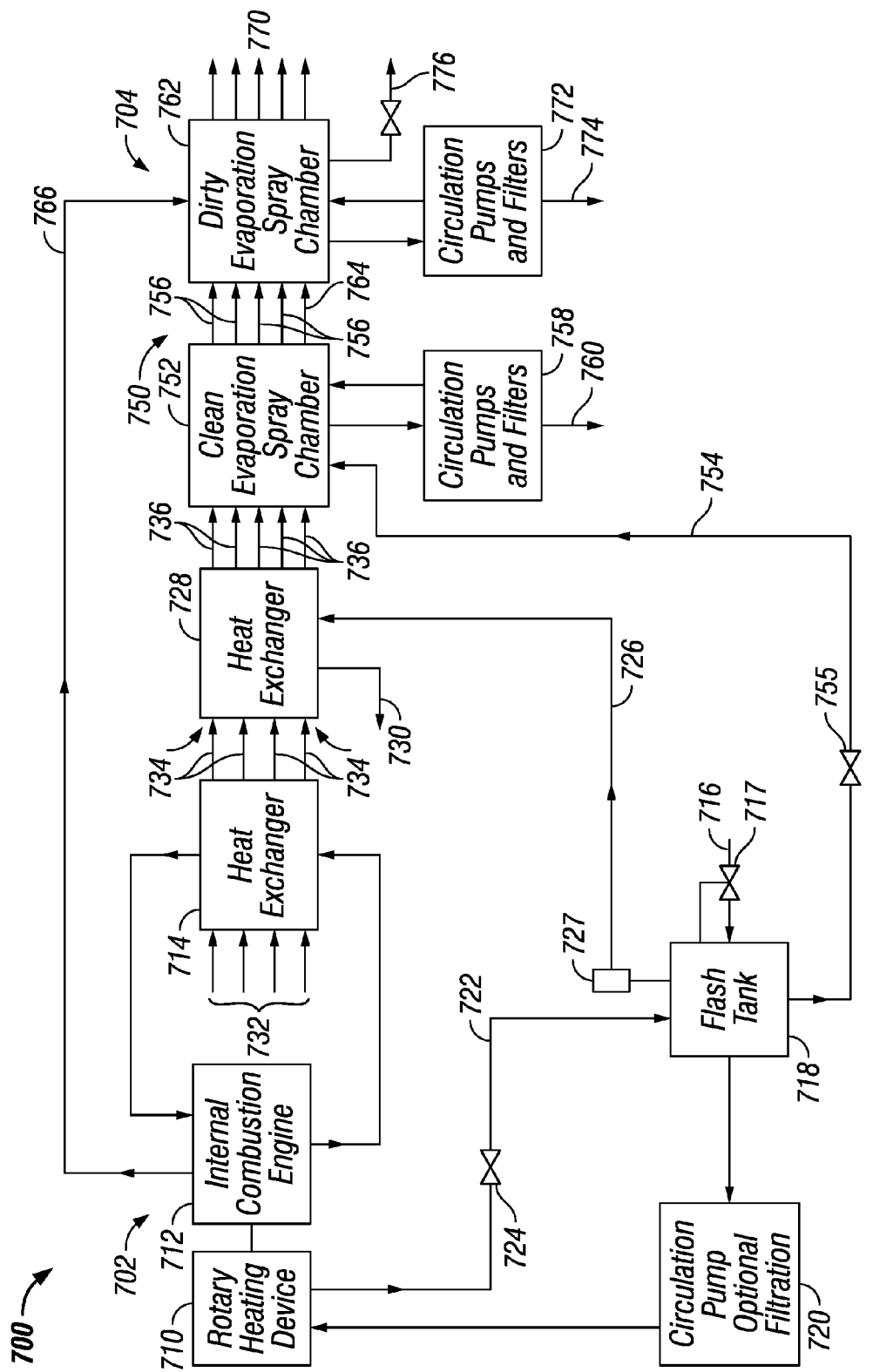
FIG. 7 illustrates an opened-loop fluid evaporating system utilizing a rotary heating device.

FIG. 7 depicts one of many possible embodiments of a fluid evaporating system 700. The system 700 may be characterized as comprising a heating section 702 and an evaporating section 704. In this embodiment, the heating section 704 comprises a rotary heating device 710, preferably a cavitation-based rotary heater, such as described previously, coupled to an output of a prime mover 712, such as a diesel or most preferably a natural gas engine. Flex joints or other coupling mechanisms (not shown) may be used as needed to couple the engine 712 to the rotary heating device 710. As will be described in more detail below, it is preferred that the engine 712 cooling system, to such as closed loop water jacket and radiator 714, be a component of the heating section 702.

The fluid to be evaporated 716 (i.e., the worked fluid), such as produced water, is introduced to a tank 718 by any convenient means. It is preferred that the tank 718 have a level control device 717 to control the amount is of fluid 716 supplied to the tank 718. The liquid phase of the fluid 716 is pumped by a circulation pump 720 to the rotary heating device 710. It will be appreciated that the pump system 120 may include one or more filters, filtration system or other discrimination devices adapted to remove particulate matter from the fluid 716. The type and efficiency of the filtration system may be selected based on the operational requirements of the rotary heating device 710 or other heating system 702 component. In other words, particulate matter may be removed as required to prevent damage to heating system 702 components. As the fluid 716 is pumped through the rotary heating device 710, the device 710 heats the fluid 716, such through as cavitation. Heated fluid 722 is returned to the tank 718 The return conduit preferable includes a valve, orifice plate or other type of restriction device 724 to create sufficient backpressure in the heating section 702 to maintain sensible heat in the fluid 722.

As heated fluid 722 enters the tank 718 it may flash, with a portion of the fluid 722 becoming steam and with the remainder being liquid. The steam portion 726 of the fluid 722 is communicated to a heat exchanger 728, which is preferably a finned tube air-to-fluid condenser adapted to remove heat from the fluid 726. It is preferred that a demister 727 be used to ensure that the fluid 726 is clean vapor. As the fluid 726 condenses, it collects and can be extracted from the heat exchanger 728 by known means as condensate 730.

As shown in FIG. 7, ambient air 732 is forced through engine heat exchanger or radiator 714 to maintain the engine 712 at operating temperature. Heated air 734 may be passed through the condenser 728 to further heat the air by transferring heat from the fluid 726 as described previously. The primary end product of heating system 702 is heated air 736.

Evaporation section 704 may comprise one or more evaporation chambers 750. As illustrated in FIG. 7, evaporation section 704 comprises a first evaporation chamber 752. In this chamber, a selected portion of the liquid phase 754 of fluid 722 is injected, such as by spraying, into the chamber 752. It is preferred that the chamber 750 be oriented such that fluid 754 is sprayed or injected adjacent the top of the chamber 750 so that the fluid falls through the heated air 736. A restriction device 755, such as a valve and/or orifice plate, may be used to control the volume of liquid fluid 754 introduced into the chamber 750. It is preferred that the restriction device 755 be a variable flow rate control valve adapted to receive control information form a liquid level indicator in the chamber 750, as discussed below. A fluid 716 preheater (not shown), such as a fluid-to-fluid heat exchanger, may be used to preheat the fluid 716 with fluid heater fluid 754.

Heated air 736 is forced into and through the chamber to contact the liquid fluid 754. The heated air 736 causes a portion of the liquid 754 to evaporate and exit the chamber 752 as heated moist air 756. That portion of the fluid 154 that does not evaporate collects in the bottom of the chamber 752. Because this collected fluid likely has some degree of particulate contamination, it is desirable to agitate or stir the fluid, such as by fluid circulation. In a preferred embodiment, a circulation pump and filter system 758 is used to both agitate the fluid that collects in chamber 752 and to filter out the particulate contaminate 760, which can be disposed of as required and allowed.

Also shown in FIG. 7 is a second evaporation chamber 762. Chamber 762 may use fluid collected in chamber 752 as shown by transfer conduit 764. Additional evaporative heat may be supplied to chamber 762 by exhaust 766 from engine 712. Thus, chamber 762 uses moist heated air 756 and exhaust gases 766 to evaporate another portion of fluid 754. The evaporated fluid is released from the chamber 762 as heated, moist air 770. Chamber 762 may also include a circulation pump and filter system 772 to both agitate the fluid that to collects in chamber 762 and to filter out the particulate contaminate 774, which can be disposed of as required and allowed. The pump system 772 may also be used to re-inject (or re-spray) the fluid 754 in subsequent chambers.

As discussed above, evaporation section 704 comprises a fluid level control, preferably associated with chamber 762, so that the system 700 is is controlled to allow most of the fluid 754 entering evaporation section 704 to be evaporated. Chamber 762 also includes a reduced water blow down valve 776 that allows extraction and disposal of concentrated or reduced water, such as that portion of fluid 754 this is not evaporated.

Having now described an embodiment of fluid evaporation system 700, it will be apparent that the invention has multiple synergistic attributes and functionalities. For example, using the engine 712 exhaust gases 766 to evaporate a portion of the fluid 722 also cleanses to a certain degree the exhaust gases that are returned to the environment. Also, it should be noted that the fluid 754 to be evaporated is the working fluid as well.

A specific construction of the produced water evaporator system described above was designed to use a 36-inch diameter Shock Waver Power Reactor fabricated under license from Hydro Dynamics, Inc. The SPR was coupled to a 600 horsepower natural gas engine having a fuel consumption of 4,300 cubic feet per hour. The system was designed to accept up to 7,250 pounds of produced water per hour (approximately 14.5 gallons per minute). The system 100 was designed to evaporate approximately 80% of the produced water input or 5,800 pounds/hour, and to create approximately 1,450 pounds/hour of reduced (unevaporated) water for disposal. The system 100 was also calculated to produce about 1,500 pounds/hour (approximately 3.0 gallons per minute) of condensate or distilled water. The finned tube condenser was designed to have aluminum fins on carbon steel tubes having about 6,800 square feet of surface area and adapted to exchange about 3,337,565 BTU/hour. The heating section was designed to operate at about 250° F. at about 35 psig. An orifice or other restriction, such as valve 724, adjacent the flash tank is useful to maintain these operating conditions. The flash tank was designed to operate at about 220° F. at about 10 psig. The condenser was designed to output air heated to about 200° F. at a velocity of about 10 feet per second.

The evaporator chambers were designed as a fiberglass tank having four successive sections. In the first evaporative section, it was contemplated that liquid from the flash tank would be sprayed into the chamber at about 150° F. TO 220° F. (depending, for example, on whether a fluid 716 preheater is used) in the presence of about 200° F. air. Two successive chambers were designed to spray unevaporated liquid from the prior sections across the heated air flowing through the chambers. The third section was similarly designed. The last section utilized the heat energy from the engine exhaust gases to aid further evaporation of the fluid. After passing through the four chambers, the heated air, laden with moisture from the fluid, was expelled from the system. As described above, reduced, unevaporated water, which is likely laden with particulates, such as salts of sodium, magnesium and/or calcium, chlorides, sulfates and/or carbonates, may be expelled from the evaporation chamber 750.

It will be appreciated that whether to use the heat energy from the engine exhaust and whether to use one or multiple evaporation chambers or process sections is a matter of design choice based upon numerous design criteria well within the capabilities of those of skill in this art having benefit of this disclosure.

Figure 8:
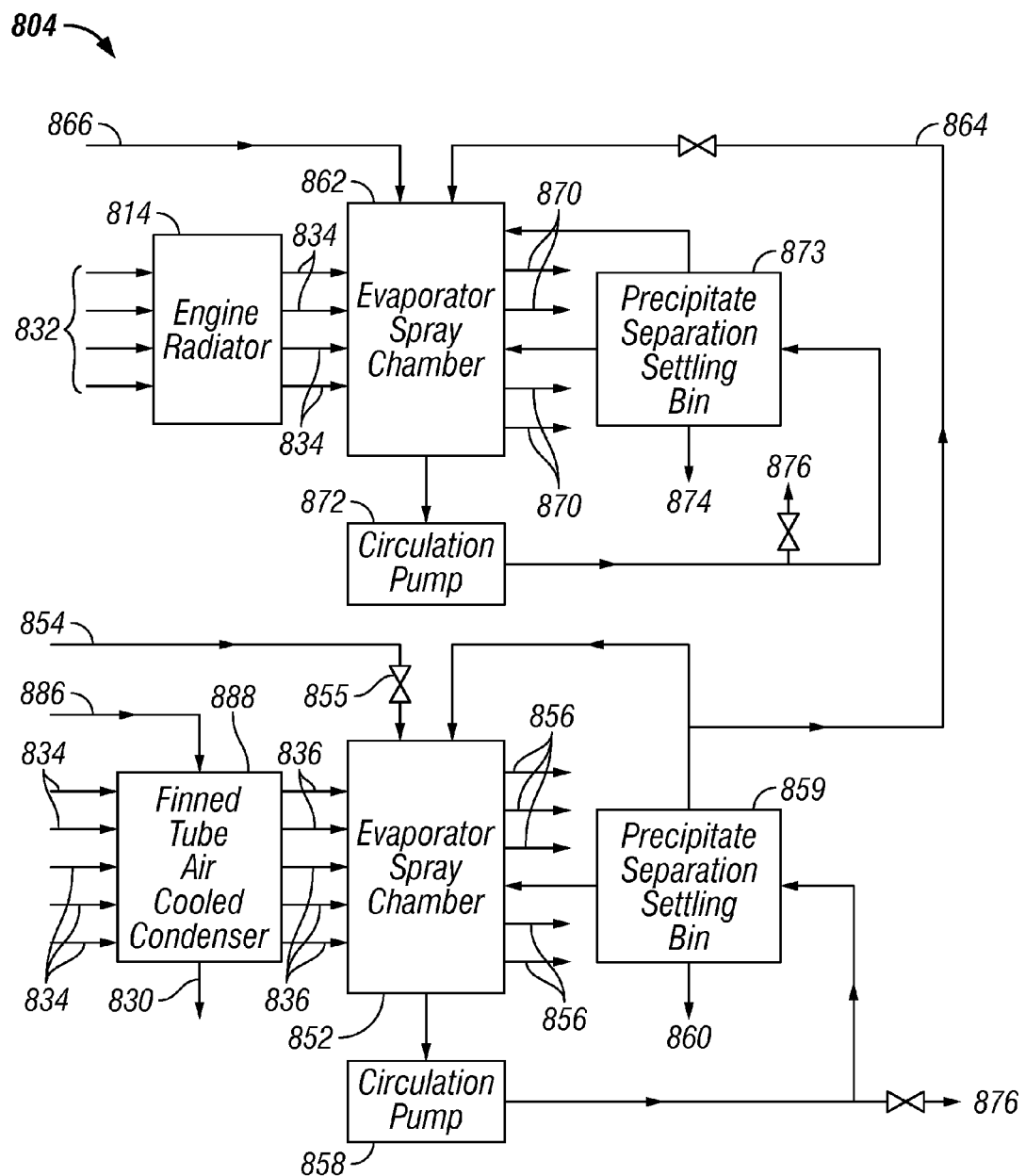
FIG. 8 illustrates an embodiment of a fluid evaporating subsystem.

FIG. 8 illustrates an embodiment of a fluid evaporating subsystem. It will be appreciated that FIG. 8 is based on the embodiment shown in FIG. 7. In fact, the reference numbers used in FIG. 7 directly translate to those used in FIG. 8. For example, reference number 814 identifies structure similar to that shown as 714 in FIG. 7.

The modifications disclosed in FIG. 8 involve using two separate evaporation chambers 852, 862. Chamber 852 is a "clean" evaporation chamber in that the evaporating air 836 is air heated by the condenser 828. Rather than to the optional filtration system 758 described in FIG. 7, FIG. 8 makes use of particle separating system 859, which may comprise a particulate separator, such as a hydrocylcone separator, and a settling bin. The particulate matter 860 that is recovered from system 859 is "clean" in that it will have little to no atmospheric contamination and, to the extend a market exists, the particulates recovered may be reused or sold.

The second evaporation chamber 862 is a "dirty" chamber in that engine exhaust gases 866 are used in conjunction with air 834 heated by engine radiator 814 to evaporate fluid 864.

It is believed that the modifications disclosed in FIG. 8 results in a better heat balance than the embodiment disclosed in FIG. 7. Also shown in FIG. 8, the "dirty" chamber 862 may use a particle separating system 873 as described above.

Figure 9:
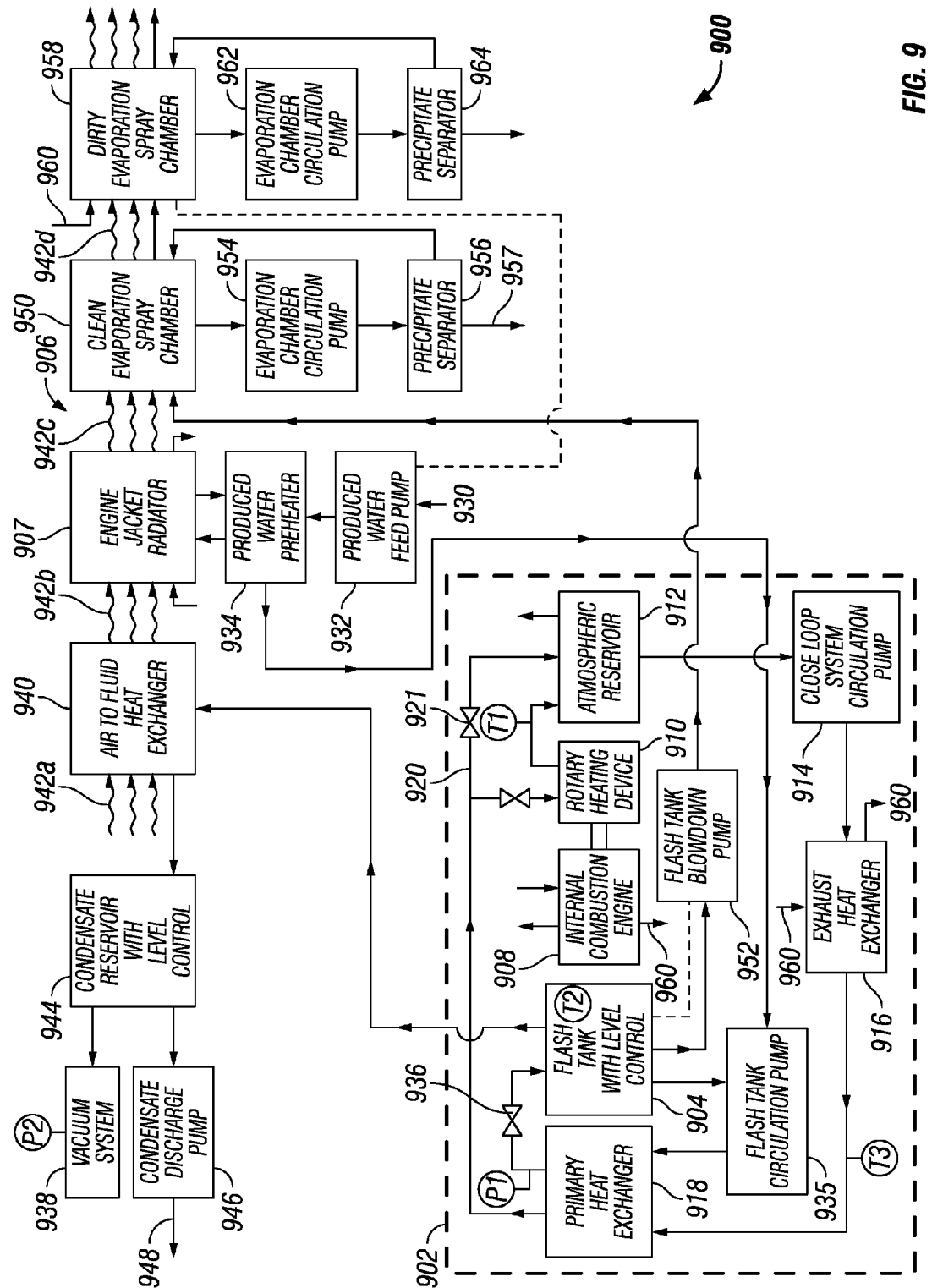
FIG. 9 illustrates a closed-loop fluid evaporating system utilizing a rotary heating device.

Illustrated in FIG. 9 is a preferred evaporation system 900 particularly suited for evaporating water produced from subterranean wells or mines. Shown generally by dashed line is a heating subsystem 902 (as described below, flash tank 904 is rightly considered a part of the evaporation subsystem 906 and not the heating subsystem 902, and engine jacket heat exchanger 907 is rightly a part of the heating subsystem 902).

Closed-loop heating subsystem 902 comprises a rotary generator 908, preferably a natural gas or diesel engine, coupled to a rotary heating device 910, preferably a water brake dynamometer. The rotary heater 910 is plumbed in closed-loop fashion to a tank 912 that is vented to the atmosphere, a circulation pump 914, such as a centrifugal pump, an engine exhaust gas 960 heat exchanger 916, engine jacket heat exchanger 907 and a primary heat exchanger 918.

Also shown in FIG. 9 is rotary heater bypass 920 and bypass valve 921. In a preferred embodiment, the temperature T3 of the working fluid as it enters the primary heat exchanger 918 is used to control the position of the bypass valve 921 to maintain the temperature of the working fluid at a desired to point, such as at a temperature below its atmospheric boiling point.

Also illustrated in FIG. 9 is an evaporating section 906 comprising a inlet 930 for the worked fluid (i.e., the fluid that is subject to evaporation), a positive displacement feed pump 932, preferably a Moyno metering pump, and a fluid-to-fluid heat exchanger 934 adapted to preheat the worked fluid with heat is from the engine jacket coolant. Preheated worked fluid is pumped 935 to the primary heat exchanger 918 where it picks up additional energy from the heating subsystem 902. The heated worked fluid is pumped to the flash tank 904 through orifice or valve 936, which is selected to maintain sufficient pressure in the system to prevent the fluid from flashing (i.e., vaporizing) until it enters the flash tank 904. It is preferred that the flash tank operate at negative atmospheric pressure, typically around about 0.9 to 2.5 psia (i.e., a vacuum of about 25 to 28 inches of mercury). A vacuum system 938, such as a liquid ring pump, may be used to maintain the vacuum in the flash tank. It will be appreciated that as heated fluid enters the flash tank 904 a portion flashes off into steam (or vapor), which is drawn by vacuum system 938 to an air-to-fluid heat exchanger 940, preferably a finned tube heat exchanger. Ambient air 942a is forced through heat exchanger 940 to transfer heat from the fluid vapor to the air 942a. As will be described below, the heated air 942b will be used to evaporate fluid that collects in the flash tank 904.

The transfer of heat in heat exchanger 940 causes the fluid vapor to condense to liquid, which is collected in a condensate receiver 944. It is preferred that the condensate receiver 944 be equipped with a fluid level control adapted to control a condensate pump 946. The level control and pump 946 may be configured to maintain a relatively fixed fluid level in condensate receiver 944. It will be appreciated that condensed fluid 948, for example water, may be used for various purposes as needed (e.g., for desuperheating purposes) or disposed of as allowed.

Returning to the heat exchanger 940, heated air 942b exits the heat to exchanger 940 and a portion is forced through the engine jacket heat exchanger or radiator 907, where the air 942b picks up additional heat. This heated air 942c along with the remainder of the air 942b is forced through one or more evaporation chambers 950. Evaporation chamber 950 may be considered a "clean" chamber insofar as the heated air 942c is relatively clean, typically having is only natural contaminants, such as dust, pollen and the like.

A fluid pump 952, such as a variable positive displacement pump, is coupled to the flash tank 904 so that collected fluid, i.e. liquid, is pumped to evaporation chamber 950. It is preferred that spray nozzles or other types of misting or spraying devices be used to spray or mist flash tank 904 fluid inside chamber 950. In a preferred embodiment, one or more spray nozzles are located adjacent an upper surface of the chamber 950. Also in the preferred embodiment, heated air 942c is forced to flow substantially normal or perpendicular to the sprayed fluid to thereby evaporate at least a portion of the liquid. It will be appreciated that suitable baffles or other contact surfaces can be installed in chamber 950 to minimize or eliminate condensed fluid from exiting chamber 950 with heated moist air 942d.

Unevaporated fluid collects in the chamber 950 and a circulation pump 954 may be used to recirculate this fluid through the chamber for additional evaporation. Additionally, if desired, the fluid can be passed through a filtration or separation system 956 to remove particulates 957 from the fluid. It is preferred that separation system 956 comprises a hydroclone. Excess fluid from system 956 can be returned to the chamber 950 for evaporation. Recovered particulates 957 can be disposed of as allowed, or if a market exists for such recovered particulates, for example, for gypsum, sold.

If only one evaporation chamber 950 is utilized, it is preferred that chamber 950 comprise a fluid level control device adapted to control fluid pump 952, preferably a positive displacement pumps such as those offered by Moyno, to maintain the fluid flow and evaporation through chamber 950 at a desired level.

Optionally, an additional evaporation chamber 958 may be utilized as desired. This evaporation chamber 958 may be described as a "dirty" chamber in that exhaust gasses from rotary generator 908 (e.g., natural gas or diesel engine) may be used to further evaporate fluid.

Exhaust gasses 960 from the heat exchanger 916 are introduced, is along with warm, moist air 942d, if desired, into chamber 958. Chamber 958 may be designed similarly to chamber or chamber 950. Fluid to be evaporated may be drawn from chamber 950 and sprayed or otherwise contacted with air 942d and gasses 960 to evaporate at least a portion of the fluid. Chamber 958 may likewise comprise a circulation pump 962 and filter/separation system 964, as desired. It will be appreciated that an additional benefit of "dirty" chamber 958 is that it can be used to scrub or clean the exhaust gasses 960 prior to discharge into the environment.

It will be appreciated that system 900 can be designed and operated to evaporate all of the fluid input into the system or only a portion of the fluid inputted. For those systems where less than complete evaporation is desired or required, evaporation chamber blowdown may be extracted and disposed of as allowed and required. For systems utilizing scrubbing of the exhaust gasses, disposal of at least a portion of the blowdown will likely be required.

Figure 10:
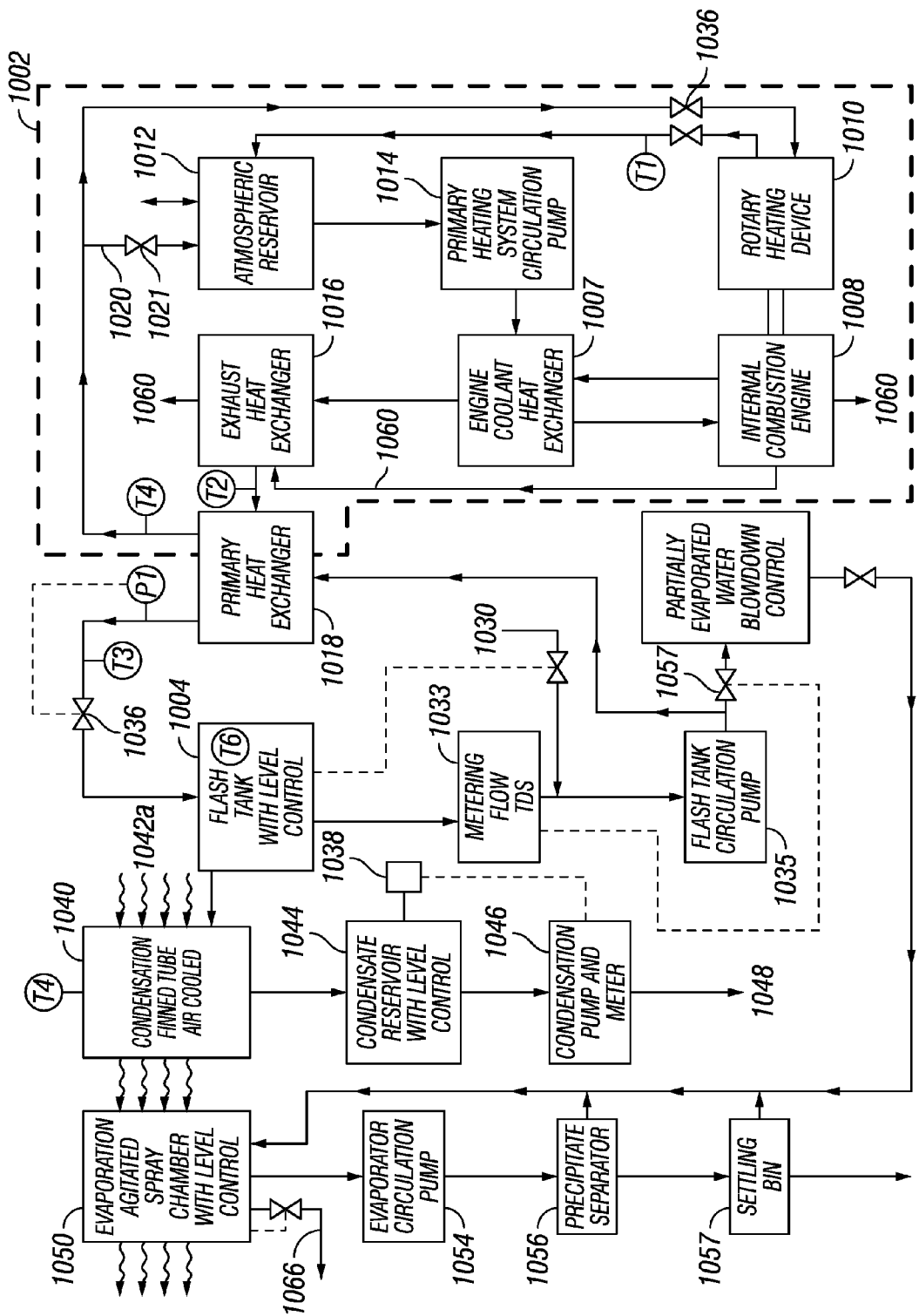
FIG. 10 illustrates another embodiment of a closed-loop fluid evaporating system utilizing a rotary heating device.
Figure 11:
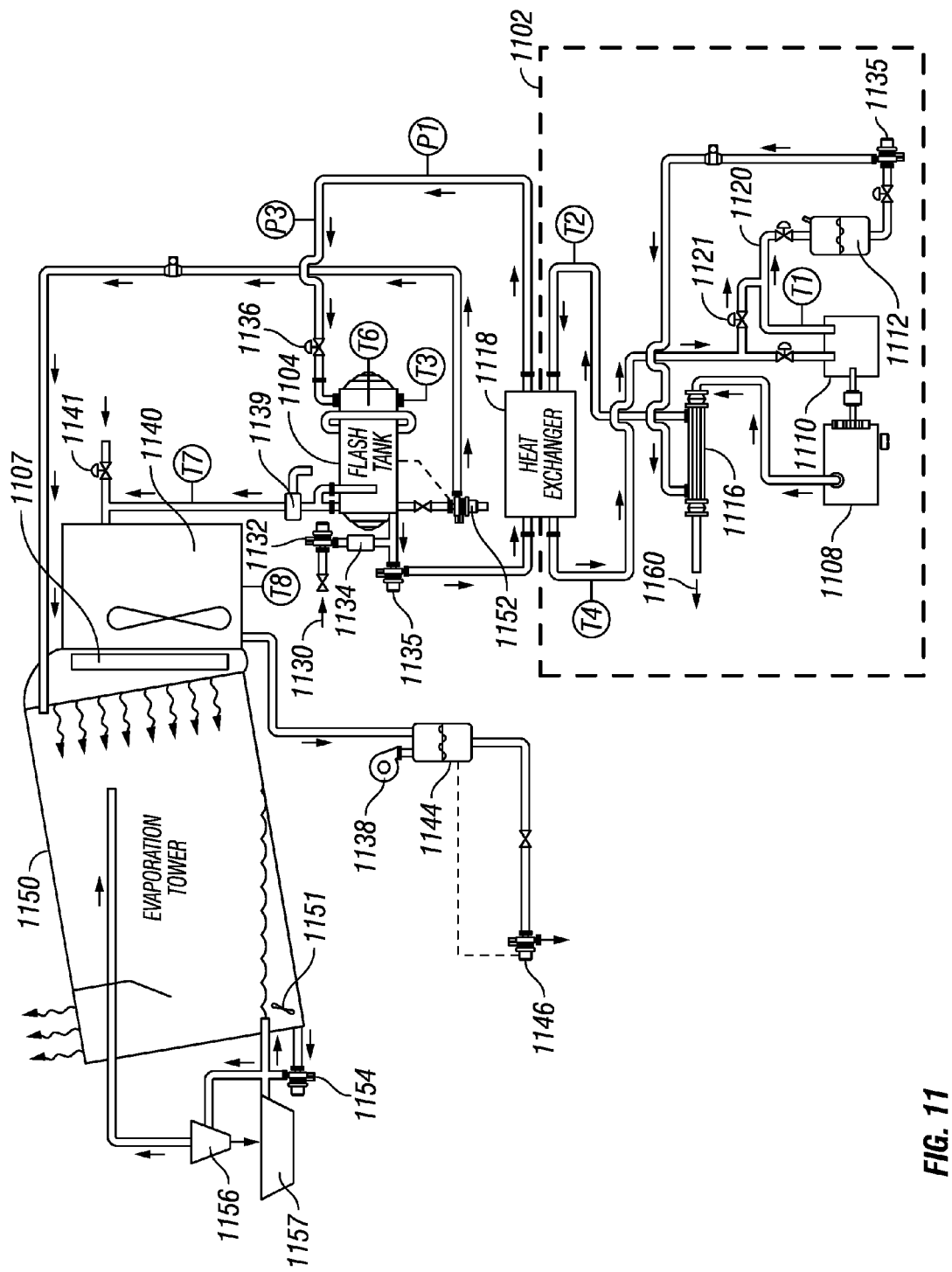
FIG. 11 illustrates yet another embodiment of a closed-loop fluid evaporating system utilizing a rotary heating device.

FIGS. 10 and 11 illustrate alternate embodiments of fluid evaporating systems and methods. The detailed description set forth above with respect to FIG. 9 substantially applies to FIGS. 10 and 11 with common structures having similar reference numbers. For example, in all of FIGS. 9, 10 and 11, the flash tank is identified by reference number 904, 1004 and 1104, respectively.

Concerning FIG. 10, incoming fluid 1030 is mixed with fluid from the flash tank 1004 and then split with a portion flowing directly to primary heat exchanger 1018 and back to the flash tank 1004, and the other portion diverted to the evaporation chamber 1050 for evaporation. In one embodiment, as the to amount of total dissolved solids, TDS, in the flash tank increases, more fluid is diverted to the evaporation chamber 1050, which allows more new fluid 1030 to enter the system. For example, a TDS instrument 1033 may be used to control flow device 1037 based on the TDS value determined.

Additionally, FIG. 11 discloses the flash tank having a demister hood 1139 to ensure that the vapor conducted to the heat exchanger 1140 is relatively dry. In addition, chamber 1150 is disclosed as having an agitator system 1151 to keep any particulate matter suspended in the liquid fluid for removal by systems 1156 and 1157. FIG. 11 also shows a desuperheating inlet 1141 allowing the introduction of fluid, if needed, such as condensate, to desuperheat the steam entering the condenser 1140.

In the embodiment shown in FIG. 11, inlet pump 1132 may be controlled by a fluid level control associated with flash tank 1104, and evaporator pump 1152 may be controlled by the TDS of the fluid in the flash tank 104 and/or a fluid level control in the evaporator reservoir 1150. The embodiment shown in FIG. 11 may be operated to achieve substantially complete evaporation of the inputted fluid.

An embodiment of an evaporator system utilizing aspects of the present inventions was designed for produced water having total dissolved solids of about 9,000 parts per million. A 600 horsepower natural gas engine with a fuel consumption of 4,300 cubic feet per hour was selected as the prime mover. The system was designed to accept up to 7,135 pounds of produced water per hour (approximately 14.3 gallons per minute). The system was designed to evaporate approximately 100% of the produced water input or 7,135 pounds/hour, and to create approximately 2,651 pounds/hour condensate for use or disposal. The system was calculated to produce about 1,500 pounds/day of solids for disposal. The finned tube condenser was designed to have aluminum fins on carbon steel tubes having about 6,800 square feet of surface area and adapted to exchange about 3,337,565 BTU/hour. The heating section was designed to operate at between about 150 and 180° F. at about atmospheric pressure. The flash tank to was designed to operate at about 130 to 170° F. at about 25 inches of mercury (vacuum). The condenser was designed to output air heated to about 130° F. at a velocity of about 60,000 cfm.

As will now be appreciated, FIGS. 9, 10 and 11 illustrate merely three of many embodiments of a fluid evaporator comprised of a flameless heating is subsystem and an evaporation subsystem. Depending upon the characteristics of the fluid to be evaporated (the worked fluid), the environment in which the system will be used and economic considerations, the evaporation system may be designed and operated to evaporate substantially all of the worked (e.g., produced water) or only a portion of the worked fluid, with the remainder being disposed of, if necessary, by allowable and economic means.

Figure 12:
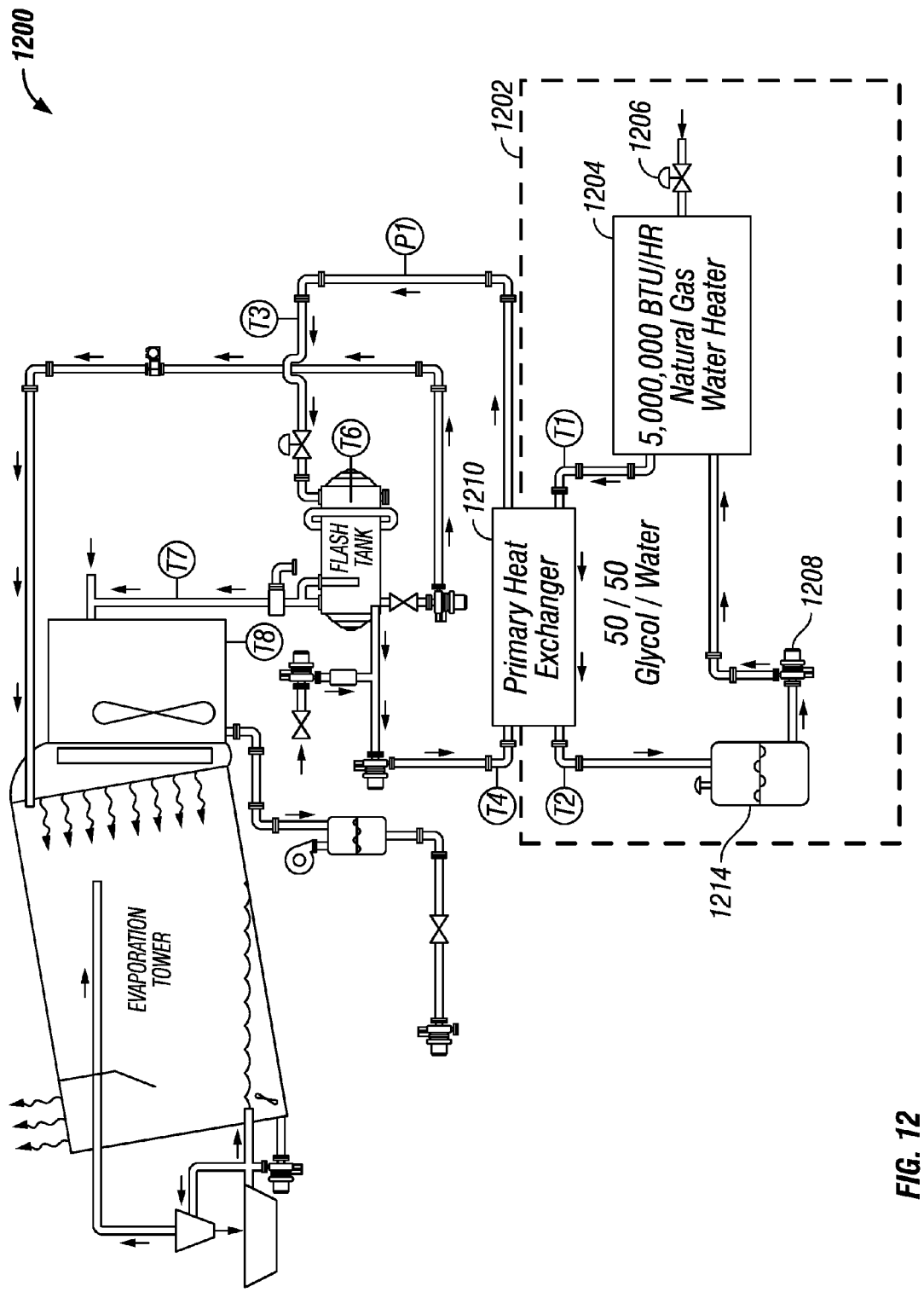
FIG. 12 illustrates a closed-loop fluid evaporating system utilizing a direct-fired boiler.

FIG. 12 illustrates a presently preferred fluid evaporating system and method comprising a direct-fired heating subsystem coupled to a single chamber evaporation subsystem. For all intents and purposes, the systems illustrated in FIGS. 11 and 12 are the same except that the fluid heating subsection 1202 in FIG. 12 is direct fired. Thus, the description and operation of the fluid evaporating subsystem in FIG. 11 applies to the fluid evaporating subsystem of FIG. 12, where like structures have like numbers. For example, flash tank is 1104 in FIGS. 11 and 1204 in FIG. 12.

Concerning the fluid heating subsystem 1202, this subsystem is substantially identical to the fluid heating system illustrated and described in FIG. 6. The heating system 1200 comprises a direct-fired fluid heater 1204, which is preferably a 5,000,000 BTU/hr natural gas water heater. It is contemplated that the heater 1204 would be fired with waste gas from the field metered into the heater 1204 through pressure control valve 1206. Therefore, it is desirable that the heater 1204 burner controls (not shown) allow for substantially real-time gas-to-air adjustments to account for changing gas quality. The working fluid in the closed-loop heating circuit is preferably a 50/50 mixture of water and glycol. The heater 1204 heats the working fluid to temperature T1, which may be, for example, 210 F. The heated working fluid is pumped 1208 through a fluid-to-fluid to heat exchanger 1210 to transfer heat from the working fluid to the worked fluid. Working fluid exits the heat exchanger 1210 and enters an atmospheric reservoir or accumulator 1214. Pump 1208 draws working fluid out of the reservoir 1214 and feeds it back to heater 1204. A temperature transducer T1 cooperates with controllable valve 1206 to control the temperature of the working fluid. In the is system illustrated in FIG. 12, the worked fluid may be heated to about 170 F.

It will also be appreciated that the evaporator systems can be used to remove (by evaporation) fluid from the worked fluid to effectively concentrate the worked fluid. The concentrated fluid can be extracted from one or more of the evaporation chambers. It will also be appreciated that it may not be desirable to concentrate certain worked fluids (e.g., a diluted well completion fluid) by forcing heated ambient air through the fluid. Particles entrained in the air, such as dirt, dust, pollen, or exhaust gasses may contaminate the worked fluid.

A fluid concentrator subsystem may comprise a flash tank in which the heated worked fluid is separated into vapor (e.g., steam) and liquid portions. The steam portion is passed through an air-to-fluid heat exchanger to condense the steam back to liquid. The condensed liquid is removed from the worked fluid thereby concentrating the worked fluid.

Figure 13:
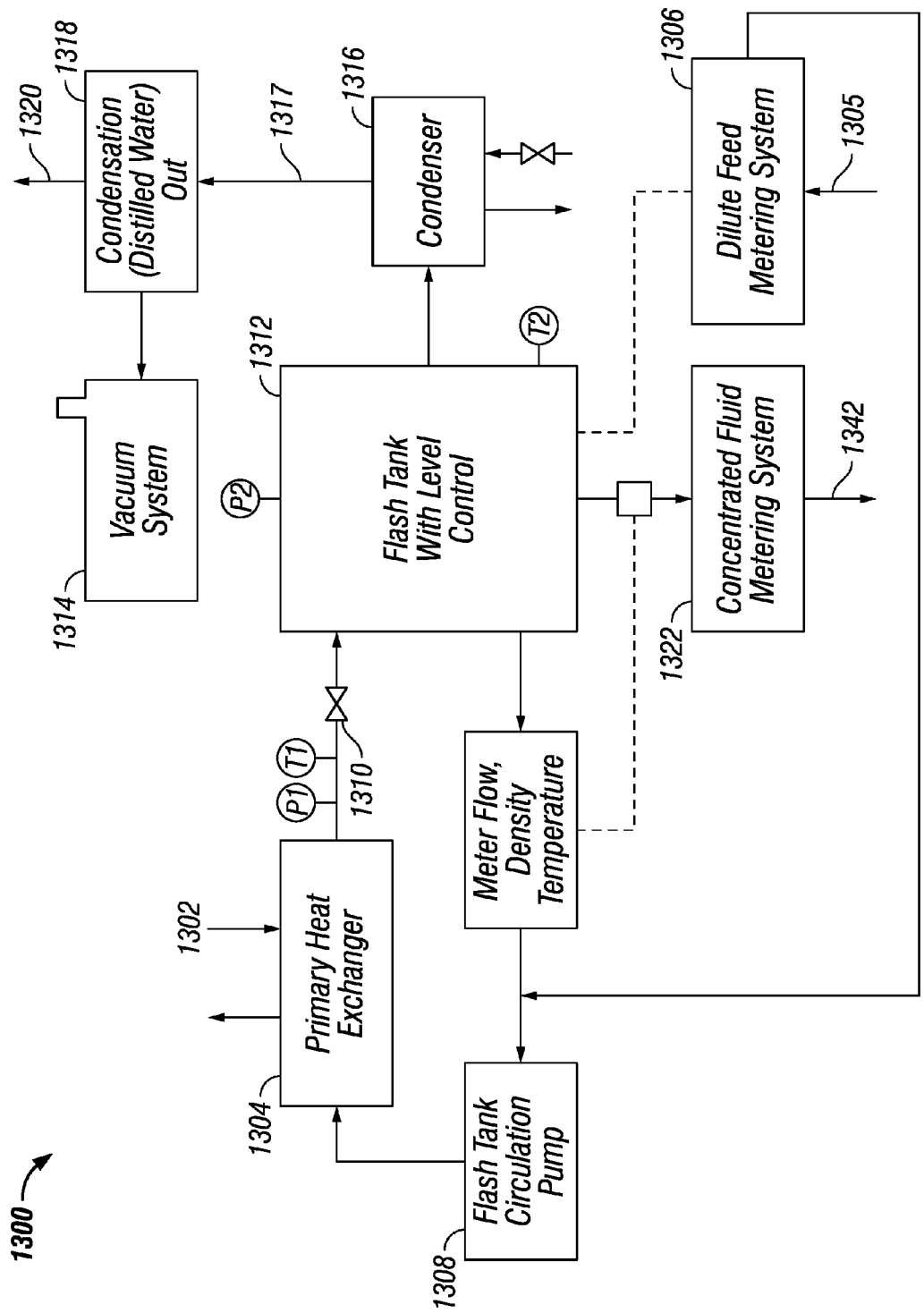
FIG. 13 illustrates a fluid concentrating subsystem.
Figure 14:
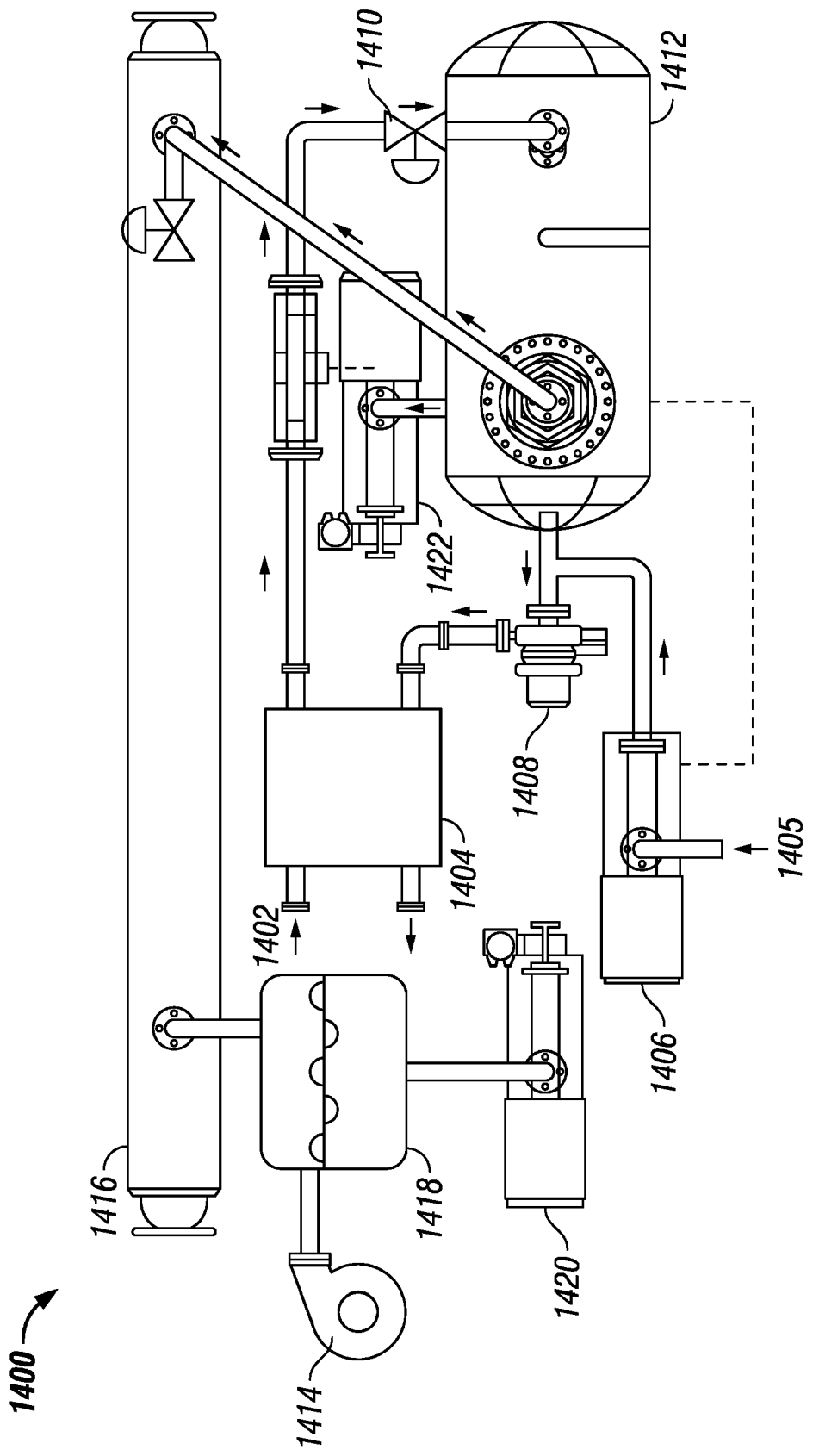
FIG. 14 illustrates a closed-loop fluid concentrating system utilizing a rotary heating device.

Turning now to FIGS. 13 and 14, embodiments of a fluid concentrating subsystem 1300 and 1400 are presented. These two embodiments utilize primary heat exchangers 1304, 404 that separate the working fluid 1302, 1402 heating subsystem from concentrating subsystem.

It will be appreciated from this disclosure that an opened-loop fluid concentrating system may be designed by, among other things, eliminating the primary heat exchanger 1304, 1404. For example, the opened-loop fluid evaporating system of FIG. 7 can be modified according to the teaching of this disclosure to produce an opened-loop fluid concentrating system.

Returning to FIGS. 13 and 14, diluted fluid (aka the "worked" fluid) 1305, 1405 is introduced into the system 1300, 1400. A metering system 1306, to 1406 may be used to determine the amount of diluted fluid introduced. A circulation pump 1308, 1408 is used to circulate the diluted fluid through the primary heat exchanger 1304, 1404 to pick up heat from the heating subsystem 1302, 1402 (not shown). The heated, dilute fluid 1306, 1406 flows through a valve or other flow restriction device 1310, 1410 configured to create a pressure is differential across the device 1310, 1410 of about 30 psid. The fluid 1305 is flashed into tank 1312, 1412 where the fluid is separated into its vapor and liquid phases.

The flash tank 1312, 1412 is preferably operated under negative atmospheric pressure of about 0.9 to 2.5 psia (i.e., a vacuum of about 25 to 28 inches of mercury). A vacuum system 1314, 1414, such as a liquid ring pump, may be used to maintain the system vacuum. The vapor phase of fluid 1305, 1405, such as steam, is passed through a heat exchanger 1316, 1416, which may be a fluid-to-fluid or air-to-fluid heat exchanger. Heat exchanger 1316, 1416 functions as a condenser to condense the fluid vapor to its liquid phase. The condensed fluid 1317 is collected in a reservoir 1318, 1418. Alternately, the condensate can be used to preheat the incoming fluid 1305, 1405. It is preferred that reservoir 1318, 1418 be equipped with a level control system that controls a condensate pump 1320, 1420. It will be appreciated that the condensate that is produced by system 1300, 1400 is relatively clean and may used for a variety of purposes or discarded as allowed. Referring back to flash tank 1312, 1412, concentrated liquid fluid 1342, 1442 accumulates in the tank and may withdrawn by a fluid extraction and metering system 1322, 1422 as described below with respect to FIGS. 15 and 16.

In addition to being coupled to opened-loop or closed loop heating subsystems, such as those described above with reference to FIGS. 1-6, the fluid concentrating subsystem embodiments described in FIGS. 13 and 14 are particularly suited for use on offshore drilling or production platforms. In such application, an existing thermal energy source from the rig or platform may be utilized. For example, and preferably, the primary working fluid 1302, 1402 is to preferably a fluid heated by conventional rig equipment, such as one or more internal combustion engines. For example, the working fluid may comprise the liquid coolant from diesel engines (e.g., water jacket coolant).

Figure 15:
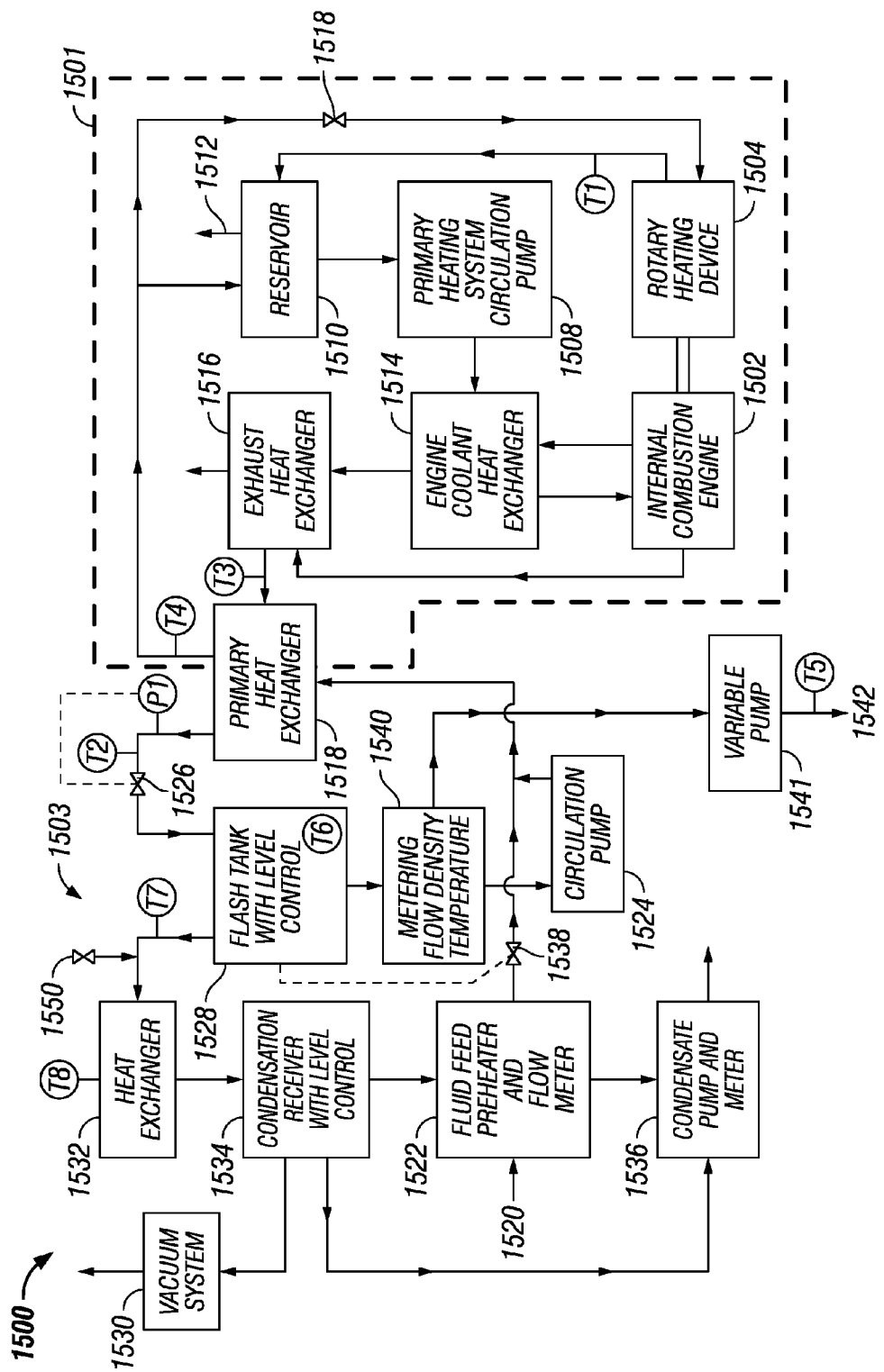
FIG. 15 illustrates another embodiment of a closed-loop fluid concentrating system utilizing a rotary heating device.
Figure 16:
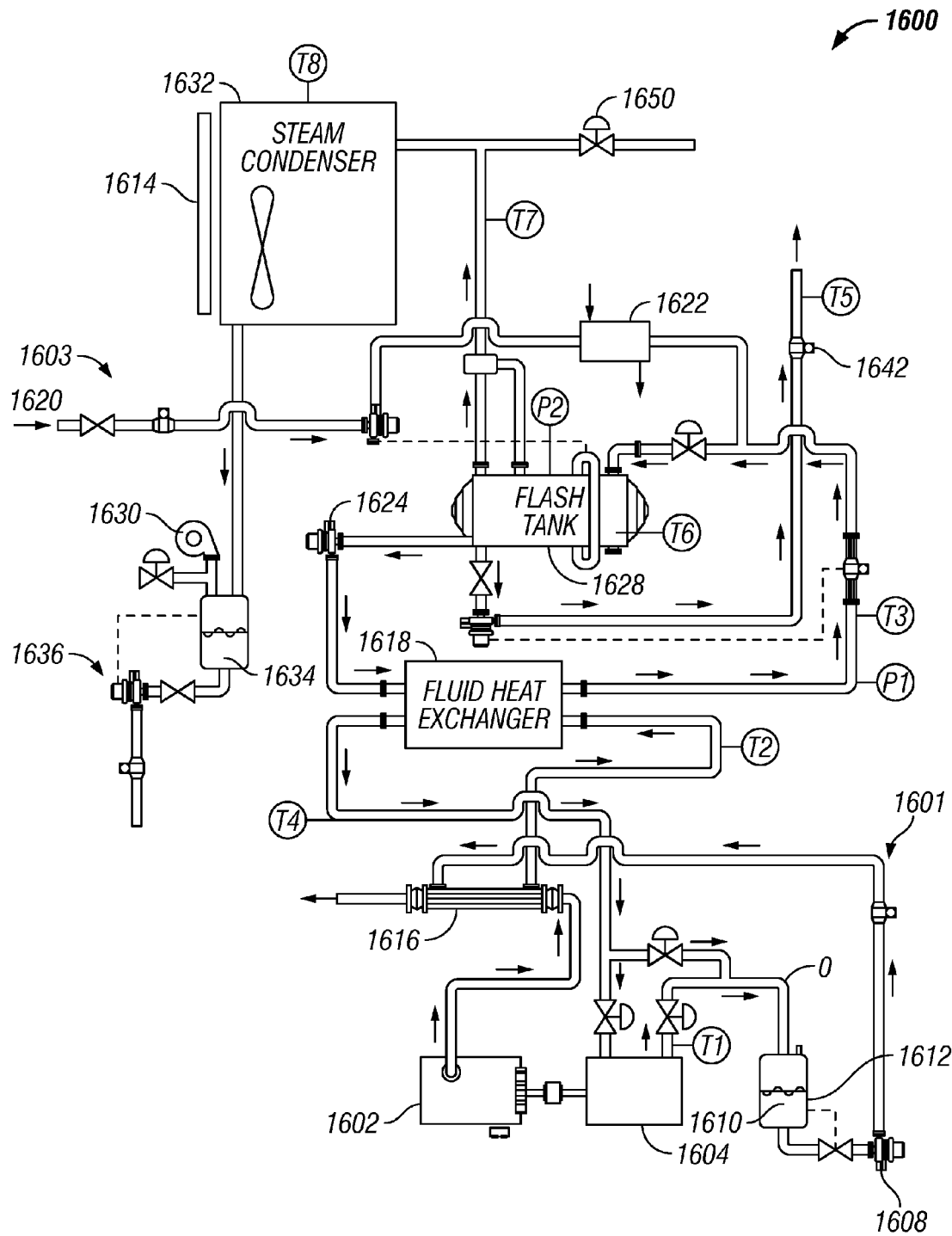
FIG. 16 illustrates yet another embodiment of a fluid concentrating system.

FIGS. 15 and 16 illustrate fluid concentrating systems 1500 and 1600 in accordance with aspects the present inventions. For purpose of this is description, like elements have like reference numerals. Thus, for example, the condensate reservoir is referenced as structures 1534 and 1534 in FIGS. 15 and 16, respectively. While only reference numbers found in FIG. 15 may be described, this description will be understood to apply equally to similarly referenced elements in FIG. 16.

The fluid concentrating system 1500, 1600 comprises a flameless heater subsystem 1501, 1601, such as those described above with respect to FIGS. 1-6. The particular fluid heating subsystem illustrated in FIGS. 15 and 16 is a closed-loop subsystem similar to that illustrated in and described by FIG. 2. The reference numbers and descriptions used for FIG. 2 are applicable to FIGS. 15 and 16 as well. For example, rotary heating device 204 in FIG. 2 is rotary heating device 1504 in FIGS. 15 and 1604 in FIG. 16.

The fluid concentrating system 1500, 1600 also comprises a concentrating subsystem 1503, 1603. In subsystem 1503 and 1603, fluid to be concentrated 1520 (aka, the "worked" fluid) is preheated in heat exchanger 1522, which is adapted to transfer heat from the condensed fluid, as will be described below, or from the engine 1502 water jacket as described previously. Pressurized and metered fluid 1520 is circulated to primary heat exchanger 1518 where the fluid 1520 is heated by the working fluid from heating subsystem 1501. Heated fluid 1520 is passed through an orifice or valve 1526 adapted to create a pressure differential across the device 1526 of about 30 psid. The fluid 1520 is flashed into tank 1528 where it is separated into its vapor and liquid phases. The flash tank 1528 is preferably operated under negative atmospheric pressure of about 0.9 to 2.5 psia (i.e., a vacuum of about 25 to 28 inches of mercury). A vacuum system 1530, such as a liquid ring pump, may be used to maintain the system vacuum.

The vapor phase of fluid 1520, such as steam, is passed through a heat exchanger 1532, which may be a fluid-to-fluid or air-to-fluid heat exchanger. Heat exchanger 1532 functions as a condenser to condense the worked fluid vapor to its liquid phase. The condensed worked fluid is collected in a reservoir 1534 and, as mentioned above, may be passed through preheater 1522 to preheat the fluid 1520 (and to cool the condensate). As shown in FIGS. 15 and 16, the preheater 1522, 1622 utilizes water jacket coolant from engine 1502, 1602. It is preferred that reservoir 1534 be equipped with a level control system that controls a condensate pump 1536. It will be appreciated that the condensate that is produced by system 1500 is relatively clean and may used for a variety of purposes or discarded as allowed.

Referring back to flash tank 1528, concentrated liquid fluid accumulates in the tank 1528 and may be circulated by pump 1524. A metering and detecting system 1540 may be used to assess, determine or calculate one or more properties of the concentrated fluid. For example, system 1540 can be adapted to determine the temperature, density, specific gravity, conductivity, flow rate or other property or characteristic of the concentrated fluid. An extraction system 1541, such as a variable speed pump controlled by system 1540 may be adapted to extract the desired concentrated fluid from the system 1500. A metering device may be used to determine the amount of concentrated fluid removed from the system.

The amount of incoming fluid 1520 allowed into the subsystem 1503 may be controlled by a valve or other flow-restricting device 1538, which may be controlled by a fluid level device in flash tank 1528. In other words, additional fluid is allowed into subsystem 1503 to maintain a desired level of fluid in flash tank 1528. As fluid is extracted from the subsystem 1503 through valve 1542, the liquid level in tank 1528 decreases thereby allowing more fluid 1520 into the system. To the extent it is desired to cool extracted concentrated fluid, such fluid to may be used, for example, to preheat incoming fluid 1520.

Also illustrated in FIGS. 15 and 16 is an optional desuperheat inlet into heat exchanger 1532, 1632. In the event the steam entering the heat exchanger is superheated, fluid, such as liquid water, can be introduced through valve 1550, 1650 to desuperheat the steam. Condensate removed from the system can be is used for this purpose.

As with other systems described herein, it is preferred, but not required that the worked fluid be limited to temperatures below its atmospheric boiling point. Thus, it is preferred that the systems be operated under vacuum. However, this is not required and is left to the design considerations of the particular system being implemented.

My inventions have been described in the context of preferred and other embodiments and not every possible embodiment of the invention has been described. A person of skill in this art having the benefit of this disclosure will now be able to mix and match various aspects of the embodiments described herein to accomplish a particular task. A person of skill will also be able to take the teachings of this disclosure and rearrange components within an embodiment or take components from other embodiments to create new embodiments, all without departing form the spirit of my inventions or the scope of the appended claims.

It will be appreciated that the fluid transporting conduits used with embodiments of the present invention may comprise piping, tubing and other fluid communications means of conventional and unconventional design and material. For most systems described herein it is preferred that the piping material be carbon steel, when possible. Of course, the operating environment may dictate the material that is used. The circulation pumps may be of any conventional or unconventional design, but for the produced water embodiment described herein, it is preferred that the pumps be hydraulic, pneumatic, electrical or direct drive (e.g., engine PTO) centrifugal pumps. Metering or positive displacement pumps, such as, but not limited to, Moyno pumps, may be used at various locations throughout the system as desired or required by the specific implementation. Detection or determination of system properties or characteristics, such as, but not limited to, pressure, temperature, density, flow rate, or Total Dissolved Solids, may be acquired through conventional instrumentation and data acquisition techniques, including manual techniques, as are well known to those of skill in the art.

Modifications and alterations to the described embodiments are now readily available to those of ordinary skill in the art. The disclosed and undisclosed embodiments are not intended to limit or restrict the scope or applicability of the invention conceived of, but rather, in conformity with the patent laws, I intend to protect all such modifications and improvements to the full extent that such falls within the scope or range of equivalent of the following claims. If a word or phrase used in a claim does not appear in this application and such word or phrase has no specialized meaning in the relevant art, then any such word should be construed according to its ordinary and customary meaning and any such phrase should be construed according to the ordinary and customary meaning of each word in the phrase.

What is claimed is:

1. A method of heating a fluid, comprising:
   providing a closed loop heat transfer system comprising:
   a internal combustion engine adapted to convert chemical energy into at least mechanical energy and waste heat energy;
   a rotary heating device operatively coupled to the engine and adapted to heat a liquid flowing there through by converting mechanical energy from the engine into thermal energy;
   a tank vented to the atmosphere and fluidly coupled to the rotary heating device and adapted to contain a portion the liquid in the closed loop system;
   a circulation pump adapted to pump the liquid through the closed loop system;
   a exhaust heat exchanger fluidly coupled to the tank and adapted to transfer thermal energy from a first portion of the waste heat to the liquid;
   a portion of a fluid-to-fluid heat exchanger fluidly coupled to the exhaust heat exchanger and to the rotary heating device; and
   wherein the closed loop heat transfer system is configured to operate at atmospheric pressure and to heat the liquid to less than an atmospheric boiling point of the liquid;
   providing an open system comprising:
   a third heat exchanger adapted to transfer thermal energy from another portion of the waste heat to the fluid;
   a second portion of the fluid-to-fluid heat exchanger fluidly coupled to the third heat exchanger; and
   a pump adapted to pump the fluid through the open system so that thermal energy in the closed-loop liquid is transferred across the fluid-to-fluid heat exchanger to the fluid;
   operating the closed loop system to heat the liquid to below its boiling point;
   pumping the fluid through the open system; and
   transferring thermal energy from the closed-loop liquid to the open system fluid, thereby heating the fluid.

2. The method of claim 1, wherein the rotary heating device is a water brake.

3. The method of claim 2, wherein the rotary heating device is a water brake dynamometer.

4. The method of claim 3, further comprising: providing an electrical generator operatively coupled to the internal combustion engine to generate electricity.

5. The method of claim 3, wherein the internal combustion engine comprises an air supercharger and further comprising: providing a charge air heat exchanger to transfer thermal energy from the charge air to the closed-loop liquid, thereby cooling the charge air.

6. The method of claim 5, further comprising: locating the charge air heat exchanger in the closed loop system downstream of the fluid-to-fluid heat exchanger.

7. The method of claim 5, further comprising: locating the charge air heat exchanger in the open system downstream of the fluid-to-fluid heat exchanger upstream of the fluid-to-fluid heat exchanger.

8. The method of claim 1, wherein the closed-loop liquid is a water-based mixture.

9. The method of claim 1, wherein the internal combustion engine is a diesel engine.

10. The method of claim 1, wherein the internal combustion engine is a natural gas engine.

11. A fluid heating system comprising:
    a closed loop heat transfer system comprising:
    a internal combustion engine adapted to convert chemical energy into at least mechanical energy and waste heat energy;
    a rotary heating device operatively coupled to the engine and adapted to heat a liquid flowing there through by converting mechanical energy from the engine into thermal energy;
    a tank vented to the atmosphere and fluidly coupled to the rotary heating device and adapted to contain a portion the liquid in the closed loop system;
    a circulation pump adapted to pump the liquid through the closed loop system;
    a exhaust heat exchanger fluidly coupled to the tank and adapted to transfer thermal energy from a first portion of the waste heat to the liquid;
    a portion of a fluid-to-fluid heat exchanger fluidly coupled to the exhaust heat exchanger and to the rotary heating device; and
    wherein the closed loop heat transfer system is configured to operate at atmospheric pressure and to heat the fluid to less than an atmospheric boiling point of the liquid; and
    an open system comprising:
    a third heat exchanger adapted to transfer thermal energy from another portion of the waste heat to the fluid;
    a second portion of the fluid-to-fluid heat exchanger fluidly coupled to the third heat exchanger; and
    a pump adapted to pump the fluid through the open system so that thermal energy in the closed-loop liquid is transferred across the fluid-to-fluid heat exchanger to the fluid, thereby heating the fluid.

12. The system of claim 11, wherein the rotary heating device is a water brake.

13. The system of claim 12, wherein the rotary heating device is a water brake dynamometer.

14. The system of claim 11, wherein the closed-loop liquid is a water-based mixture.

15. The system of claim 11, wherein the internal combustion engine is a diesel engine.

16. The system of claim 11, wherein the internal combustion engine is a natural gas engine.

17. The system of claim 11, further comprising: an electrical generator operatively coupled to the internal combustion engine to generate electricity.

18. The system of claim 11, wherein the internal combustion engine comprises an air supercharger and further comprising: a charge air heat exchanger to transfer thermal energy from the charge air to the closed-loop liquid, thereby cooling the charge air.

19. The system of claim 18, wherein the charge air heat exchanger is located in the closed loop system downstream of the fluid-to-fluid heat exchanger.

20. The system of claim 18, wherein the charge air heat exchanger is located in the open system upstream of the fluid-to-fluid heat exchanger.

* * * * *